US010257630B2

(12) United States Patent
Reijniers et al.

(10) Patent No.: US 10,257,630 B2
(45) Date of Patent: Apr. 9, 2019

(54) COMPUTER PROGRAM AND METHOD OF DETERMINING A PERSONALIZED HEAD-RELATED TRANSFER FUNCTION AND INTERAURAL TIME DIFFERENCE FUNCTION

(71) Applicant: UNIVERSITEIT ANTWERPEN, Antwerp (BE)

(72) Inventors: Jonas Reijniers, Borgerhout (BE); Herbert Godelieve P Peremans, Ghent (BE); Bart Wilfried M Partoens, Mortsel (BE)

(73) Assignee: UNIVERSITEIT ANTWERPEN, Antwerp (BE)

( * ) Notice: Subject to any disclaimer, the term of this patent is extended or adjusted under 35 U.S.C. 154(b) by 0 days.

(21) Appl. No.: 15/553,798

(22) PCT Filed: Feb. 12, 2016

(86) PCT No.: PCT/EP2016/053020
§ 371 (c)(1),
(2) Date: Aug. 25, 2017

(87) PCT Pub. No.: WO2016/134982
PCT Pub. Date: Sep. 1, 2016

(65) Prior Publication Data

US 2018/0035226 A1 Feb. 1, 2018

(30) Foreign Application Priority Data

Feb. 26, 2015 (GB) ..................................... 1503213

(51) Int. Cl.

| | |
|---|---|
| ***H04R 29/00*** | (2006.01) |
| ***H04S 7/00*** | (2006.01) |
| ***G06F 3/01*** | (2006.01) |

(52) U.S. Cl.
CPC ........... *H04R 29/001* (2013.01); *G06F 3/012* (2013.01); *H04S 7/304* (2013.01); *H04S 2400/15* (2013.01); *H04S 2420/01* (2013.01)

(58) Field of Classification Search
CPC ...... H04S 7/304; H04S 7/303; H04S 2400/15; H04S 2420/01; G06F 3/012; H04R 29/001

(Continued)

(56) References Cited

U.S. PATENT DOCUMENTS 4,817,149 A * 3/1989 Myers ..................... H04S 7/302 381/1
5,729,612 A * 3/1998 Abel .................... H04R 29/001 381/1

(Continued)

FOREIGN PATENT DOCUMENTS

EP 2822301 A1 1/2015
WO 02078389 A2 10/2002

OTHER PUBLICATIONS

Great Britain Search Report From GB Application No. GB1503213.9, dated Aug. 24, 2015.

(Continued)

*Primary Examiner* — William A Jerez Lora
(74) *Attorney, Agent, or Firm* — Workman Nydegger

(57) ABSTRACT

A method of estimating an individualized head-related transfer function (HRTF) and an individualized interaural time difference function (ITDF) of a particular person, comprising the steps of: a) obtaining a plurality of data sets (Li, Ri, Oi), each comprising a left and a right audio sample (Li, Ri) from a pair of in-ear microphones, and orientation information (Oi) from an orientation unit, measured in a test-arrangement whereby an acoustic test signal is rendered via a loudspeaker; b) storing the data sets in a memory; c) estimating the directions of the loudspeaker relative to the (Continued)

804
805
movements
802
803
Computer
801
sound reproduction equipment
808 person based on the orientation data and the audio data; d) estimating the ITDF based on the data sets and on the estimated relative position/orientation; e) estimating the HRTF, based on the data sets and based on the estimated relative position/orientation.

15 Claims, 11 Drawing Sheets

(58) Field of Classification Search
USPC ...................................................... 381/56, 58
See application file for complete search history.

(56) References Cited

U.S. PATENT DOCUMENTS 9,661,439 B2 * 5/2017 Yamashita .............. G06F 21/32
9,769,585 B1 * 9/2017 Hills ......................... H04S 5/00
2003/0044002 A1 * 3/2003 Yeager .................... H04S 1/005 379/444
2004/0091119 A1 5/2004 Duraiswami et al.
2005/0080616 A1 4/2005 Leung et al.
2006/0045294 A1 3/2006 Smyth
2009/0052703 A1 2/2009 Hammershoi
2012/0089401 A1 * 4/2012 Hymel ................ H04M 3/5335 704/260
2012/0201405 A1 8/2012 Slamka et al.
2012/0328107 A1 12/2012 Nystrom et al.
2013/0114821 A1 * 5/2013 Hamalainen ......... G10K 11/178 381/71.6
2014/0198918 A1 7/2014 Li et al.
2015/0304790 A1 * 10/2015 Yamashita .............. G06F 21/32 381/303

OTHER PUBLICATIONS

International Search Report From PCT Application No. PCT/EP2016/053020, dated Apr. 12, 2016.

* cited by examiner

COMPUTER PROGRAM AND METHOD OF DETERMINING A PERSONALIZED HEAD-RELATED TRANSFER FUNCTION AND INTERAURAL TIME DIFFERENCE FUNCTION

FIELD OF THE INVENTION

The present invention relates to the field of 3D sound technology. More particularly, the present invention relates to a computer program product and a method of estimating an individualized head-related transfer function (HRTF) and an individualized interaural time difference function (ITDF) of a particular person. The present invention also relates to a data carrier comprising such computer program product, and to a kit of parts comprising such data carrier.

BACKGROUND OF THE INVENTION

Over the past decades there has been great progress in the field of virtual reality technology, in particular as regards the visual virtual reality. 3D TV screens have found their way to the general public, and especially the home theaters and video games take advantage hereof. But 3D sound technology still lags behind. Yet, it is—at least in theory—quite easy to create a virtual 3D acoustic environment, called Virtual Auditory Space (VAS). When humans localize sound in 3D space, they use two audio signals picked up by the left and right ear. An important cue hereby is the so called "interaural time difference" (ITD): depending on the direction of the sound (w.r.t. the persons head), the sound will first reach the left or the right ear, and this time difference contains information about the lateral angle $\phi$ (see FIG. 2). The interaural time difference function (ITDF) describes how the ITD varies with the direction of the sound source (e.g. loudspeaker), see FIG. 3 for an example.

Other cues are contained in the spectral content of the sound as it is registered by the inner ear. After all, before the sound waves coming from a certain direction reach the tympanic membrane, they interfere with the body, the head and the pinna. And by this interference some frequencies are more easily transmitted than others; consequently, there occurs a spectral filtering which is dependent on the direction from where the sound is coming. This filtering is described by the so-called "Head-Related Transfer Function" (HRTF), (see example in FIG. 4) which for each direction of the sound source describes the proportion of each frequency that is transmitted or filtered out. The spectral content of the signals received in both ears thus contains additional information (called: spectral cues) about the location of the sound source, and especially about the elevation $\varphi$ (see FIG. 2), the height at which the sound-source is located relative to the head, but also whether the sound source is located in front of, or behind the person.

To create a realistic 3D acoustic virtual reality, it is therefore paramount to know the ITDF and HRTF of a particular person. When these are known, suitable time delays and spectral filtering can be added artificially for any specific direction, and in this way, the listener is given the necessary cues (time cues and spectral cues) to reconstruct the 3D world.

Currently, there are already a lot of applications on the market that use the HRTF to create a virtual 3D impression, but so far they are not widely used. After all, they make use of a single, generalized ITDF and HRTF set, which is supposed to work for a wide audience. Just as with 3D-vision systems where it is assumed that the distance between the eyes is the same for everyone, these systems make use of the average ITDF and HRTFs. While this does not pose significant problems for vision, it does for 3D-audio. When for an individual, the distance between the eyes is significantly different from the average distance, it may occur that the users depth perception is not optimal, causing the feeling that "something is wrong", but the problems related to 3D-audio are much more severe. Small differences may cause large errors. Equipped with virtual "average ears", the user experiences effectively a spatial effect—the sound is no longer inside the head—, but somewhere outside the head, but there is often much confusion about the direction where the sound is coming from. Most mistakes are made in the perception of the elevation, but also, and this is much more disturbing: front and rear are often interchanged. Sound that should actually come from the front, is perceived as coming from behind, significantly lowering the usefulness of this technology.

Hence, despite the fact that the HRTF and ITDF of different people are similar, even small differences between a person's true HRTF and ITDF and the general HRTF and ITDF cause errors which, in contrast to 3D-vision, are detrimental to the spatial experience. This is probably one of the reasons why VAS through stereo headphones hasn't realized its full potential yet. Hence, to make optimal use of the technology, it is necessary to use a personalized HRTF and ITDF. But how to achieve this on a large scale, so that this technology can be made available to the general public?

The HRTF and ITDF of a person are traditionally recorded using specialized infrastructure: in an anechoic chamber, in which a sound source is moved around the subject, and for each sampled direction the corresponding signal arriving at the left and right ear is recorded by means of microphones which are arranged in the left and right ear of the subject, just at the entrance of the ear canal. Although in recent years progress has been made and new methods have been developed to simplify this procedure, such measurement remain very cumbersome and expensive. It is therefore not possible to measure the HRTF and ITDF of all potential users in this way. Therefore, there is a need to look for other ways to individualize the HRTF and ITDF.

U.S. Pat. No. 5,729,612A describes a method and apparatus for measuring a head-related transfer function, outside of an anechoic chamber. In this document it is proposed to measure the HRTF using a sound wave output by a loudspeaker mounted on a special support. A left and right audio signal is captured by two in-ear microphones worn by a subject whose head movements are tracked by a position sensor and/or who is sitting on a chair which can be oriented in particular directions. The data will be processed in a remote computer. The document is silent about how exactly the ITDF and HRTF are calculated from the measured audio signals and position signals. However, a calibration step is used to determine a transfer characteristic of the loudspeaker and microphones, and the method also relies heavily on the fact that the relative position of the person and the loudspeaker are exactly known.

There is still room for improvement or alternatives.

SUMMARY OF THE INVENTION

It is an object of embodiments of the present invention to provide a good computer program product and a good method of determining or estimating a personalized interaural time difference function (ITDF) and a personalized head-related transfer function (HRTF).

It is an object of particular embodiments of the present invention to provide a computer program product and a method of determining or estimating a personalized ITDF and a personalized HRTF, based on data captured by the end user himself, in a relatively simple test-arrangement without requiring specific skills or professional equipment, for example at his or her home, and that the complexity is shifted to the data processing step. In other words, to provide a computer program product and a method that can be applied on a large scale, so that a large user group can be served.

It is an object of particular embodiments of the present invention to provide a computer program product and a method implementing an algorithm for determining or estimating a personalized ITDF and a personalized HRTF, based on left and right audio samples, and on (possibly inaccurate) orientation samples provided by an orientation unit of which the position/orientation on the head is possibly unknown, and this without requiring a calibration step. If available, the algorithm may also make use of (possibly inaccurate) information on the position of one or more of the loudspeakers, and/or on (possibly inaccurate) information on the position/orientation of the orientation unit on the head and/or of (possibly inaccurate) information on the spectral characteristics of the equipment and the environment being used.

It is an object of particular embodiments of the present invention to provide a computer program product and a method of determining or estimating a personalized ITDF and a personalized HRTF that gives a more accurate 3D-virtual sound experience (as compared to the general or average IDTF and average HRTF) when used in a 3D-virtual auditory system (3D-VAS), for at least some users, preferably for a large group of users, most preferably for all users, in particular in terms of a reduced number of front/back misperceptions.

These and other objectives are accomplished by embodiments of the present invention.

In a first aspect, the present invention provides a computer program product for estimating an individualized head-related transfer function (HRTF) and an interaural time difference function (ITDF) of a particular person, the computer program product, when being executed on at least one computing device comprising a processor and a memory, being adapted for performing the steps of: a) obtaining a plurality of data sets, each data set comprising a left audio sample originating from a left in-ear microphone and a right audio sample originating from a right in-ear microphone and orientation information originating from an orientation unit, the left audio sample and the right audio sample and the orientation information of each data set being simultaneously captured in an arrangement wherein: the left in-ear microphone being inserted in a left ear of the person, and the right in-ear microphone being inserted in a right ear of the person, and the orientation unit being mounted on or to a head of the person, and the person being located at a distance from a loudspeaker, and the loudspeaker being arranged for rendering an acoustic test signal comprising a plurality of acoustic stimuli, and the person turning a head in a plurality of different orientations during the rendering of the acoustic test signal; b) storing the plurality of data sets in a memory; c) estimating a direction of the loudspeaker with respect to the head of the person for each data set stored in the memory; d) estimating the individualized ITDF of the person, based on the plurality of data sets stored in the memory and based on the directions estimated in step c); e) estimating the individualized HRTF of the person, based on the plurality of data sets stored in the memory and based on the directions estimated in step c).

It is an advantage of embodiments of the present invention that it provides an individualized ITDF and HRTF for an individual, whose ITDF and HRTF need to be estimated only once, and can subsequently be used in a variety of applications, such as in 3D games or in telephone conference applications to create a spatial experience.

It is an advantage of embodiments of the present invention that the algorithm for estimating the ITDF and the HRTF is tuned to a particular arrangement for capturing the required audio and orientation data, which arrangement is very customer friendly, so that the method can be performed by most individuals at his/her home, without requiring expensive equipment. In particular, apart from a pair of in-ear microphones, other equipment required for performing the capturing part is widely available (for example: device for rendering audio on a loudspeaker, a smartphone). It is an advantage that the spectral filter characteristic of the loudspeaker need not be known.

It is an advantage of embodiments of the present invention that the algorithm for estimating the ITDF and the HRTF enables to estimate the relative orientation of the head during the data acquisition, without knowledge of the (exact) orientation/position of the orientation unit on the head and without knowledge of the (exact) position of the loudspeaker.

It is an advantage of embodiments of the present invention that the algorithm for estimating the ITDF and the HRTF can be performed on the same, or on another device than the device which was used for capturing the audio and orientation data. For example, the data may be captured by a smartphone and transmitted to a remote computer or stored on a memory-card in a first step, which data can then be obtained (e.g. received via a cable or wireless) or retrieved from the memory card by the remote computer for actually estimating the ITDF and HRTF.

It is an advantage of embodiments of the present invention that the algorithm for estimating the ITDF and the HRTF does not require very precise orientation information (for example a tolerance margin of about +/−10° may be acceptable), because the algorithm does not solely rely on the orientation data for determining the relative position, but also on the audio data.

Although the ITDF and HRTF provided by the present invention will not be as accurate as the ITDF and HRTF measured in an anechoic room, it is an advantage that the personalized ITDF and HRTF as can be obtained by the present invention, when used in an 3D-VAS system, will give far better results than the use of that same 3D-VAS system with an "average" ITDF and "average" HRTF, especially in terms of front/back misperceptions.

It is an advantage of embodiments of the present invention that the algorithm may contain one or more iterations for deriving the ITDF and HRTF, while the data capturing step only needs to be performed once. Multiple iterations will give a better approximation of the true ITDF and HRTF, at the expense of processing time.

It is an advantage of embodiments of the present invention that it is based on the insight that multiple unknowns (such as e.g. the unknown orientation between the person and the loudspeaker, and/or the unknown transfer characteristic of the microphones and/or that of the loudspeaker, and/or the unknown ITDF and HRTF) can be calculated "together" by using stepwise approximations, whereby in each approximation an improved version of the unknown variables is used. The number of iterations can be selected by the skilled person, based on the required accuracy.

It is an advantage of embodiments of the present invention that it does not require special equipment (e.g. an anechoic chamber with a plurality of microphones arranged in a sphere), but can be conducted by the user himself/herself at his/her home in a very simple set-up.

In an embodiment, more than one loudspeaker may be used (for example two loudspeakers), located at different directions with respect to the user, in which case more than one acoustic test signal would be used (for example two), and in which case in step c) the direction of the loudspeaker that generated the specific acoustic stimulus, would be estimated.

It is an advantage of using two loudspeakers, for example positioned so as to form an angle of 45° or 90° as seen from the users position, that it results in improved estimates of the loudspeakers' directions, because there are two points of reference that do not change positions. Also, the user would not have to turn his/her head as far as compared to a setup with only a single loudspeaker, and yet cover a larger part of the sampling sphere.

In an embodiment, step e) further comprises estimating a combined spectral filter characteristic of the loudspeaker and the microphones.

It is an advantage of embodiments of the present invention that the algorithm for estimating the ITDF and HRTF does not need to know the spectral filter characteristic of the loudspeaker and of the in-ear microphones beforehand, but that it can estimate the combined spectral filter characteristic of the loudspeaker and the microphone as part of the algorithm. This offers the advantage that the user can (in principle) use any set of (reasonable quality) in-ear microphones and any (reasonable quality) loudspeaker. This offers the advantage that no particular type of loudspeaker and of in-ear microphones needs to be used during the data capturing, and also that a specific calibration step may be omitted. But of course, it is also possible to use a loudspeaker and in-ear microphones with a known spectral filter characteristic, in which case the algorithm may use the known spectral filter characteristic, and the estimation of the combined spectral filter characteristics of the loudspeaker and in-ear microphones can be omitted.

The estimation of a combined spectral filter characteristic of the loudspeaker and the microphones may be based on the assumption or approximation that this combined spectral filter characteristic is a spectral function in only a single parameter, namely frequency, but is independent of orientation. This approximation is valid because of the small size of the in-ear-microphones and the relatively large distance between the person and the loudspeaker.

In an embodiment, estimating the combined spectral filter characteristic of the loudspeaker and the microphones comprises: making use of a priori information about a spectral filter characteristic of the loudspeaker, and/or making use of a priori information about a spectral filter characteristic of the microphones.

Embodiments of the present invention may make use of statistical information about typical in-ear microphones and about typical loudspeakers. This may for example comprise the use of an "average" spectral filter characteristic and a "covariance"-function, which can be used in the algorithm to calculate a "distance"-measure or deviation measure or a likelihood of candidate functions.

In an embodiment, the estimation of step c) is based on the plurality of data sets stored in the memory and on at least one transfer function that relates acoustic cues to spatial information.

In this embodiment, use is made of at least one transfer function, such as for example an ITDF and/or an HRTF of humans, to enable extraction of spatial information (e.g. orientation information) from the left and right audio samples.

It is an advantage of the algorithm, that taking into account at least one transfer function, allows to extract spatial information from the audio data, which, in combination with the orientation sensor data, enables to estimate the relative orientation of the head during the data acquisition, without knowledge of the (exact) position/orientation of the orientation unit on the head and without knowledge of the (exact) position of the loudspeaker.

It is an advantage of the algorithm of the present invention that it is able to extract spatial information from audio data, necessary to estimate the ITDF and the HRTF, although the exact ITDF and/or HRTF are not yet known, for example by solving the problem iteratively. In a first iteration, a general transfer function is used to extract spatial information from the audio data. This information can then be used to estimate the HRTF and/or ITDF, which, in a next iteration, can then be used to update the at least one transfer function, ultimately converging to an improved estimate of the ITDF and HRTF.

It is noted that in case more than one loudspeaker is used (for example two loudspeakers) located at different directions as seen from the users position, it is an advantage that the spatial information is extracted from two different sound sources, located at different directions. Generally, the transfer function which relates acoustic cues to spatial information is not spatially homogeneous, i.e., not all spatial directions are equally well represented in terms of acoustic cues, and consequently, sounds coming from some directions are easier to localize based on their acoustic content, than those originating from other directions. By using more than one loudspeaker (for example two), one can cope with these 'blind spots' in the transfer function, because the two loudspeakers sample different directions of the transfer function, and if one loudspeaker produces a sound that is difficult to localize, the sound originating from the other loudspeaker may still contain the necessary directional information to make inferences on the orientation of the head.

In an embodiment, the at least one transfer function that relates acoustic cues to spatial information is an interaural time difference function (ITDF).

It is an advantage of this embodiment that the orientation of the head with respect to the loudspeaker during the capturing of each data set is calculated solely from an (average or estimated) ITDF, and not of the HRTF. This allows step c) and step d) to be performed (and optionally iterated) in combination, before step e) is executed. This offers the advantage that step e) needs to be executed only once.

In an embodiment, the at least one transfer function that relates acoustic cues to spatial information is an interaural time difference function (ITDF) and a head-related transfer function (HRTF).

It is an advantage of this embodiment that the orientation of the head with respect to the loudspeaker during the capturing of each data set is calculated both from an (average or estimate of an) ITDF, and from an (average or estimate of a) HRTF, because this allows an improved estimate of the orientation of the head with respect to the loudspeaker during the data acquisition, which, in turn, enables to improve the estimates of the ITDF and HRTF.

In an embodiment, step d) of estimating the ITDF comprises making use of a priori information about the personalized ITDF based on statistical analysis of a database containing a plurality of ITDFs of different persons.

Embodiments of the present invention may make use of statistical information about typical ITDFs as contained in a database. This may for example comprise the use of an "average" ITDF and a "covariance"-function, which can be used in the algorithm to calculate a "distance"-measure or deviation measure or a likelihood of candidate functions.

It is an advantage of embodiments of the present invention that information from such databases (some of which are publically available) is taken into account, because it increases the accuracy of the estimated individualized ITDF and estimated individualized HRTF.

It is an advantage of particular embodiments of the present invention wherein only a subset of such databases is taken into account, for example, based on age or gender of the particular person.

In an embodiment, step e) of estimating the HRTF comprises making use of a priori information about the personalized HRTF based on statistical analysis of a database containing a plurality of HRTFs of different persons.

The same advantages as mentioned above when using a priori information about the ITDF, also apply for the HRTF.

In an embodiment, step c) comprises: extracting timing information from the left and right audio samples of the plurality of data sets; extracting spectral information from the left and right audio samples of the plurality of data sets; estimating the directions of the loudspeaker with respect to the head of the person, based on the extracted timing information and spectral information, thereby using a general ITDF and a general HRTF.

In this embodiment, described herein as "algorithm 1", both the ITDF and the HRTF are used in step c).

In an embodiment, step d) comprises: determining an estimate of the individualized ITDF, based on the timing information and spectral information contained in the left and right audio samples, and on the estimated directions of step c); and step e) comprises: determining an estimate of the individualized HRTF, based on the timing information and spectral information contained in the left and right audio samples, and on the estimated directions of step c).

In an embodiment, the computer device is further adapted for performing the following combination of steps: i) after performing step d) and step e), performing again step c) for obtaining an updated estimation of the directions of the loudspeaker with respect to the head of the person, but using the estimate of the individualized ITDF as determined in step d) instead of the general ITDF and using the estimate of the individualized HRTF as determined in step e) instead of the general HRTF; ii) after performing step i), performing again step d) for obtaining an update of the individualized ITDF of the person, using the updated estimation of the directions of the loudspeaker of step i); iii) after performing step i), performing again step e) for obtaining an update of the individualized HRTF of the person, using the updated estimation of the directions of the loudspeaker of step i).

It is an advantage of an embodiment wherein at least one iteration is performed that the estimated ITDF and HRTF approximate the true ITDF an the true HRTF better (in terms of accuracy, not in terms of angular sampling density), and thus that the risk of front/back misperception, when using the estimated ITDF and/or HRTF in a 3D-VAS-system decreases.

In an embodiment, step c) comprises: extracting timing information from the left and right audio samples of the plurality of data sets; estimating the direction of the loudspeaker with respect to the head of the person for each data set, based on the extracted timing information, thereby using a general ITDF but without using a general HRTF.

In this embodiment, described herein as "algorithm 2", only the ITDF is used in step c).

In an embodiment, the computing device is adapted for performing step e) after performing the combination of step c) and step d); and step e) further comprises: extracting spectral information from the left and right audio samples of the plurality of data sets; estimating an elevation offset based on the extracted spectral information; determining an estimate of the individualized HRTF, based on the timing information and spectral information contained in the left and right audio samples, and on the estimated directions of the loudspeaker of step c).

In an embodiment, the computing device is adapted for performing at least one iteration of the followings combination of steps: i) performing again step c) for obtaining an updated estimation of the directions of the loudspeaker, whereby in the second and each subsequent execution of step c) the estimate of the individualized ITDF is used instead of the general ITDF; ii) performing again step d) for obtaining an updated individualized ITDF of the person, using the updated estimation of the directions of the loudspeaker of step i).

It is an advantage of an embodiment wherein at least one iteration is performed that the estimated ITDF and HRTF approximate the true ITDF an the true HRTF better (in terms of accuracy, not in terms of angular sampling density), and thus that the risk of front/back misperception, when using the estimated ITDF and/or HRTF in a 3D-VAS-system decreases.

In an embodiment, the orientation unit is adapted for providing orientation information relative to the earth gravity field and to the earth magnetic field.

It is an advantage of embodiments of the present invention that an orientation unit is used which can provide absolute coordinates or position or orientation information relative to any coordinate system that is fixed to the earth, in contrast to a positioning unit requiring a sender unit and a receiver unit, because it requires only a single unit.

In an embodiment, the audio test signal comprises a plurality of acoustic stimuli with a duration of less than 4.80 ms.

Preferably the acoustic stimuli are broadband acoustic stimuli.

It is an advantage of using broadband acoustic stimuli signals (rather than pure tone signals), because wide bandwidth signals allow extraction of the spectral information and hence estimation of the HRTF over the complete frequency range of interest for each orientation of the head, and also because the accuracy of the ITD estimation is higher for wide bandwidth signals.

It is an advantage of using test signals with acoustic stimuli having a duration less than 4.80 ms, because for such a short signal, it can reasonably be assumed that the head is (momentarily) standing still, even though in practice it may be (and typically will be) rotating, assuming that the person is gently turning his/her head at a relatively low angular speed (e.g. at less than 60° per second), and not abruptly.

It is also an advantage that such short duration signals avoid overlap between reception along the direct path and reception of the same signal along an indirect path containing at least one additional reflection on one of the boundaries of the room, or objects present inside the room. Hence, complex echo cancelling techniques can be avoided.

In an embodiment, the computer program product is furthermore adapted for: selecting, dependent on an analysis of the plurality of data sets, a predefined audio message from a group of predefined audio messages, and for rendering said selected audio message via a second loudspeaker, different from the first loudspeaker, for providing information or instructions to the person before and/or during and/or after the rendering of the audio test signal.

Such embodiment may for example be useful in a (quasi) real-time processing of step c), whereby (accurate or approximate) position and/or orientation information is extracted from a subset of the captured samples, or ideally in the time between each successive audio samples, and whereby the algorithm further verifies whether the 3-dimensional space around the head is sampled with sufficient density, and whereby corresponding acoustical feedback is given to the user, after, or even before the acoustic test file is finished.

But other messages could of course also be given, for example a textual instruction for the user to keep his/her head still for over a certain number of acoustic stimuli (for example five or ten) for allowing averaging of the audio samples collected for that particular orientation, so that a higher signal to noise ratio (SNR) can be achieved.

Of course, the same functionality can also be provided by a non-real-time application, wherein for example the acoustic test signal is rendered a first time, and a first plurality of data sets is captured, which first plurality of data samples is then processed in step c), and whereby step c) further comprises a verification of whether the space around the head is sampled with sufficient density, and whereby a corresponding acoustic message is given to the user via the second loudspeaker, for example to inform him/her that the capturing is sufficient, or asking him/her to repeat the measurement, optionally thereby giving further instructions to orient the head in certain directions.

In this way the actual step of data capturing can be made quite interactive between the computer and the person, with the technical effect that the HRTF is estimated with at least a predefined density.

In this way the risk of insufficient spatial sampling, and hence the risk of having to interpolate between two or more ITDF curves, respectively HRTF curves for a direction that was not spatially sampled sufficiently dense, can be (further) reduced.

In an embodiment, the computing device is electrically connected to the left and right in-ear microphone, and is electrically connected to the orientation unit, and the computing device is adapted for capturing the plurality of left audio samples and the right audio samples and the orientation information in step a), and for performing step b) to step e).

In such an embodiment, all steps, including the actual data capturing, are performed by the computing device, for example by a desktop computer or a laptop computer equipped with a USB-device with a stereo audio input or the like. If an orientation unit of a smartphone is used in this embodiment, the computer would retrieve the orientation information from the smartphone, for example via a cable connection or via a wireless connection, and the only task of the smartphone would be to provide the orientation data.

In an embodiment, the orientation unit is comprised in a portable device, the portable device being mountable to the head of the person, and the portable device further comprises a programmable processor and memory, and interfacing means electrically connectable to the left and right in-ear microphone, and means for storing and/or transmitting said captured data sets, and the computer program product comprises a first software module adapted to be performed by the processor of the portable device and a second software module adapted to be performed by the computing device, and the first software module is adapted for performing the capturing of the left and right audio samples and the capturing of the orientation information of step a), and for transmitting the captured data sets to the computing device or for storing the captured data sets on an exchangeable memory, and the second software module is adapted for obtaining the plurality of data sets, and for performing step b) to step e).

In such an embodiment the step of the actual data capturing is performed by the portable device, for example a smartphone equipped with a plug-on device with a stereo audio input or the like, while the processing of the captured data can be performed off-line by another computer, e.g. in the cloud. Since the orientation unit is part of the smartphone itself, no extra cables are needed.

It is an advantage of such embodiment that the cables to the in-ear microphones can be (much) shorter, resulting in a higher freedom of movement. Moreover, the captured left and right audio signals may have a better SNR because of less movement of the cables and smaller loops formed by the cables, hence less pick-up of unwanted electromagnetic radiation. The portable device may comprise a sufficient amount of memory for storing said audio signals, e.g. 1 Gbyte of volatile memory (RAM) or non-volatile memory (FLASH), and the portable device may for example comprise a wireless transmitter, e.g. an RF transmitter (e.g. Bluetooth, WiFi, etc), for transmitting the data sets to an external device.

In such embodiment, the external computer would perform all steps, except the data capturing, and the portable device, e.g. smartphone, would perform the data capturing.

Of course another split of the functionality is also possible, for example the first execution of step c), using an average ITDF and/or average HRTF may also be executed on the smartphone, while the other steps are performed by the computer.

In an embodiment, the orientation unit is comprised in a portable device, the portable device being mountable to the head of the person, and the portable device further comprises a processor and a memory forming the computing device, and the portable device further comprises interfacing means electrically connectable to the left and right in-ear microphone, and the processor of the portable device is adapted for performing the capturing of the left and right audio samples and the capturing of the orientation information of step a), and for storing the captured data sets in the memory in step b), and for performing step c) to step e).

In such an embodiment all of the steps a) to e), including the actual data capturing, are performed on the portable device, for example the smartphone. Although this may not be practical yet with many smartphones anno 2015, it is contemplated that such embodiment may well be practical over a few years time, taking into account that the processing power and memory size of digital devices increases as technology progresses.

In an embodiment, the portable device further comprises a loudspeaker, and the processor of the portable device is further adapted for analyzing the orientation information in order to verify whether a 3D space around the head is sampled with at least a predefined density, and for rendering a first, resp. second predefined audio message via the loudspeaker of the portable device if the outcome of the verification is that the space is, resp. is not sampled with the predefined density.

It is an advantage of such embodiment that some form of control and interaction is provided during or shortly after the data capturing, before the actual estimation of the ITDF and HRTF starts. In this way the accuracy of the estimated individualized ITDF and HRTF can be increased, and the risk of misperceptions during rendering of audio data in a 3D-VAS system, due to interpolation of ITDF and HRTF curves in a coarsely sampled 3D-space, may be reduced.

Although the orientation information may have insufficient accuracy for being used directly as direction information from where a sound is coming from when determining the HRTF, the accuracy is typically sufficient to enable verification of whether the 3D space around the person's head is sufficiently sampled. Of course there may be more than two predefined messages. Examples of such messages may for example contain the message that the “test is over”, or that the “test needs to be repeated”, or that “additional sampling is required when looking at the right and above”, or any other message.

In a second aspect, the present invention relates to a data carrier comprising the computer program product according to the first aspect.

In an embodiment, the data carrier further comprises a digital representation of said acoustic test signal.

In a third aspect, the present invention also relates to the transmission of a computer program product according to the first aspect.

In an embodiment, the transmission further comprises the transmission of a digital representation of said acoustic test signal.

In a fourth aspect, the present invention also relates to a kit of parts, comprising: a data carrier according to the second aspect, and a left in-ear microphone and a right in-ear microphone.

It is an advantage of such a kit of parts that it provides all the hardware a typical end user needs (on top of the computer and/or smartphone and audio-equipment which he/she already has), to estimate his/her individualized ITDF and individualized HRTF. This kit of parts may be provided as a stand-alone package, or together with for example a 3D-game, or other software package. The acoustic test signal may for example be downloaded from a particular website on the internet, and burned on an audio-CD disk, or written on a memory-stick, or obtained in another way.

In an embodiment, the kit of parts further comprises a second data carrier comprising a digital representation of said acoustic test signal.

The second data carrier may for example be an audio-CD disk playable on a standard stereo-set, or a DVD-disk playable on a DVD player or home theater device.

In a fifth aspect, the present invention relates to a method of estimating an individualized head-related transfer function (HRTF) and an individualized interaural time difference function (ITDF) of a particular person in a computing device, the method comprising the steps of: a) obtaining a plurality of data sets, each data set comprising a left audio sample originating from a left in-ear microphone and a right audio sample originating from a right in-ear microphone and orientation information originating from an orientation unit, the left audio sample and the right audio sample and the orientation information of each data set being simultaneously captured in an arrangement wherein: the left in-ear microphone being inserted in a left ear of the person, and the right in-ear microphone being inserted in a right ear of the person, and the orientation unit being mounted on or to a head of the person, and the person being located at a distance from a loudspeaker, and the loudspeaker being arranged for rendering an acoustic test signal comprising a plurality of audio test-fragments, and the person turning a head in a plurality of different orientations during the rendering of the acoustic test signal; b) storing the plurality of data sets in a memory; c) estimating a direction of the loudspeaker with respect to the head of the person, for each data set stored in the memory; d) estimating the individualized ITDF of the person, based on the plurality of data sets stored in the memory and based on the directions estimated in step c); e) estimating the individualized HRTF of the person, based on the plurality of data sets stored in the memory and based on the directions estimated in step c).

In an embodiment, step e) further comprises estimating a combined transfer function of the loudspeaker and the microphones.

In an embodiment, estimating the combined spectral filter characteristic of the loudspeaker and the microphones comprises: making use of a priori information about a spectral filter characteristic of the loudspeaker, and/or making use of a priori information about a spectral filter characteristic of the microphones.

In an embodiment, the estimation of step c) is based on the plurality of captured data sets stored in the memory and on at least one transfer function that relates acoustic cues to spatial information.

In an embodiment, the at least one transfer function that relates acoustic cues to spatial information is an interaural time difference function (ITDF).

In an embodiment, the at least one transfer function that relates acoustic cues to spatial information is an interaural time difference function (ITDF) and a head-related transfer function (HRTF).

In an embodiment, step d) of estimating the ITDF function comprises making use of a priori information about the personalized ITDF based on statistical analysis of a database containing a plurality of ITDFs of different persons.

In an embodiment, step e) of estimating the HRTF comprises making use of a priori information about the personalized HRTF based on statistical analysis of a database containing a plurality of HRTFs of different persons.

In an embodiment, step c) comprises: extracting timing information from the left and right audio samples of the plurality of data sets; extracting spectral information from the left and right audio samples of the plurality of data sets; estimating the directions of the loudspeaker with respect to the head of the person, based on the extracted timing information and spectral information, thereby using a general ITDF and a general HRTF.

In an embodiment, step d) comprises: determining an estimate of the individualized ITDF, based on the timing information and spectral information contained in the left and right audio samples, and on the estimated directions of step c); and step e) comprises: determining an estimate of the individualized HRTF, based on the timing information and spectral information contained in the left and right audio samples, and on the estimated directions of step c).

In an embodiment, the method further comprises one or more iterations of the following combination of steps: i) after performing step d) and step e), performing again step c) for obtaining an updated estimation of the directions of the loudspeaker with respect to the head of the person, but using the estimate of the individualized ITDF as determined in step d) instead of using the general ITDF and using the estimate of the individualized HRTF as determined in step e) instead of using the general HRTF; ii) after performing step i), performing again step d) for obtaining an update of the individualized ITDF of the person, using the updated estimation of the directions of the loudspeaker of step i); iii) after performing step i), performing again step e) for obtaining an update of the individualized HRTF of the person, using the updated estimation of the directions of the loudspeaker of step i).

In an embodiment, step c) comprises: extracting timing information from the left and right audio samples of the plurality of data sets; estimating the directions of the loudspeaker with respect to the head of the person for each data set, based on the extracted timing information, thereby using a general ITDF but without using a general HRTF.

In an embodiment, step e) is performed after execution of the combination of step c) and step d); and step e) further comprises: extracting spectral information from the left and right audio samples of the plurality of data sets; estimating an elevation offset based on the extracted spectral information; determining an estimate of the individualized HRTF, based on the timing information and spectral information contained in the left and right audio samples, and on the estimated directions of the loudspeaker of step c).

In an embodiment, the method further comprising at least one iteration of the followings combination of steps: i) performing again step c) for obtaining an updated estimation of the directions of the loudspeaker, whereby in the second and each subsequent execution of step c) the estimate of the individualized ITDF is used instead of the general ITDF; ii) performing again step d) for obtaining an updated individualized ITDF of the person, using the updated estimation of the directions of the loudspeaker of step i).

In an embodiment, the orientation unit provides orientation information relative to the earth gravity field and to the earth magnetic field.

In an embodiment, the method further comprises the steps of: inserting the left in-ear microphone in the left ear of the person and inserting the right in-ear microphone in the right ear of said person for capturing the left and the right audio signal originating from the loudspeaker.

In an embodiment, the method further comprises the step of: mounting the orientation unit on or to the head of the person.

In an embodiment, the orientation unit is comprised in a portable device, and wherein the method further comprises the step of: mounting the portable device comprising the orientation unit on or to the head of the person.

In an embodiment, the method further comprises the step of: rendering the acoustic test signal via the loudspeaker.

In an embodiment, the audio test signal comprises a plurality of acoustic stimuli with a duration of less than 4.80 ms.

In an embodiment, the method further comprises the step of: selecting, dependent on an analysis of the captured data sets, a predefined audio-message from a group of predefined audio messages, and rendering said selected audio-message via a second loudspeaker, different from the first loudspeaker, for providing information or instructions to the person before and/or during and/or after the rendering of the audio test signal.

According to a sixth aspect, the present invention also provides an individualized ITDF and an individualized HRTF estimated by a method according to the fifth aspect.

According to a seventh aspect, the present invention also relates to a 3D-VAS system for generating a virtual audio signal for a particular person, the 3D-VAS system making use of an individualized head-related transfer function (HRTF) and an individualized interaural time difference function (ITDF) obtained by a method according to the fifth aspect.

A personalized HRTF has a wide application and exploitation potential in various audiovisual sectors, the main ones being: computer games, home theater, and teleconferencing. In these three areas there is already software available that uses the generalized HRTF to generate 3D audio illusion, but because it is not yet possible to determine (e.g. measure or estimate) a personalized HRTF in an easy manner, these applications so far do not allow the use of a personalized HRTF, which would require a (limited) adaptation of the software.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
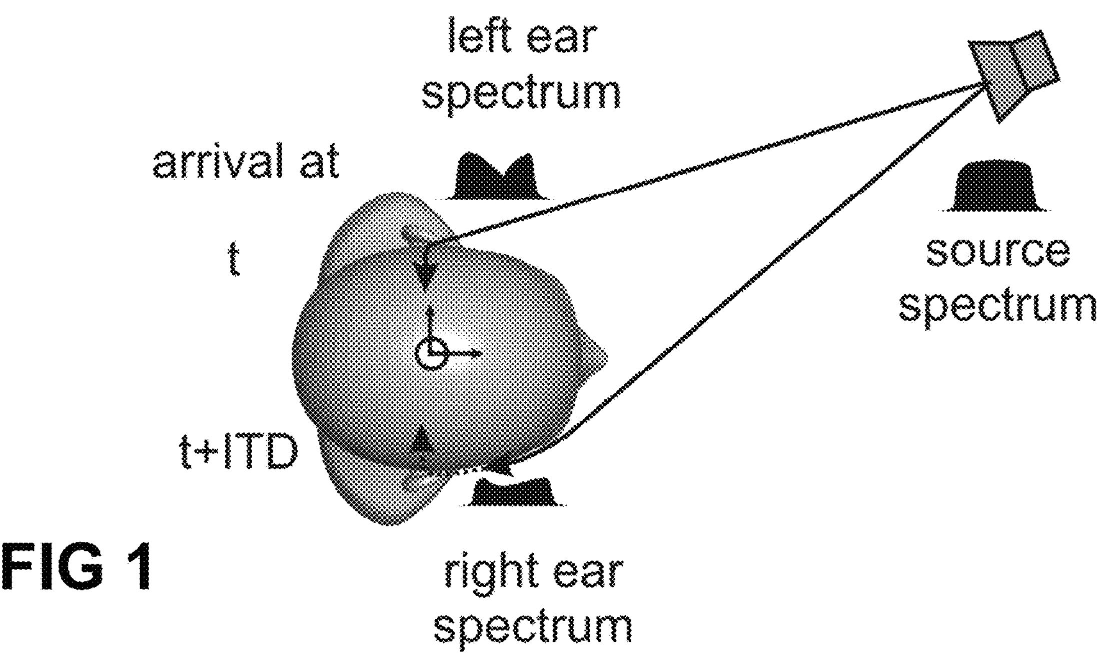
FIG. 1 illustrates how sound from a particular direction arrives at different times at the left and right ear of a person, and how a different spectral filtering is imposed by both ears.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

Detailed Description Of Illustrative Embodiments

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Figure 3:
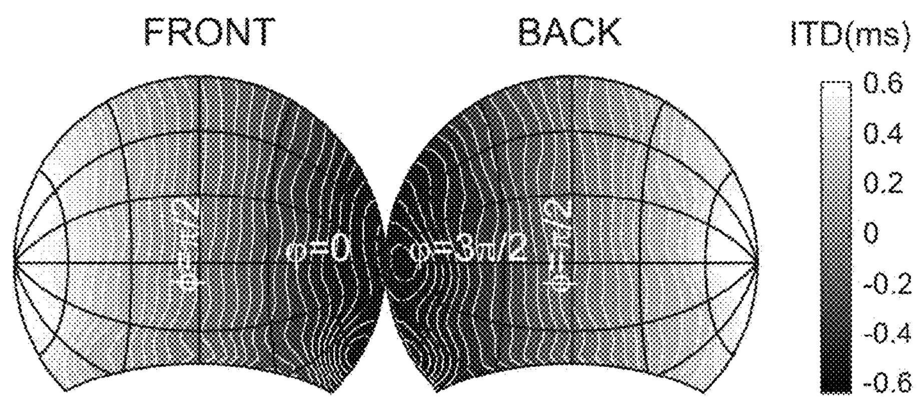
FIG. 3 shows an example of an interaural time difference function (ITDF) of a particular person, whereby different intensity (grayscale) is used to indicate different values of the interaural time difference (ITD), depending on the direction from where sound is coming. Iso-ITD contours are shown in white curved lines.

In the context of the present invention, with "interaural time difference" or "ITD" is meant a time difference, which can be represented by a value (e.g. in milliseconds), but this value is different depending on the direction where the sound is coming from (relative to the head). The representation of ITD values for different directions is referred to herein as the "interaural time difference function" or "ITDF", and an example of such a function is shown in FIG. 3.

Figure 4:
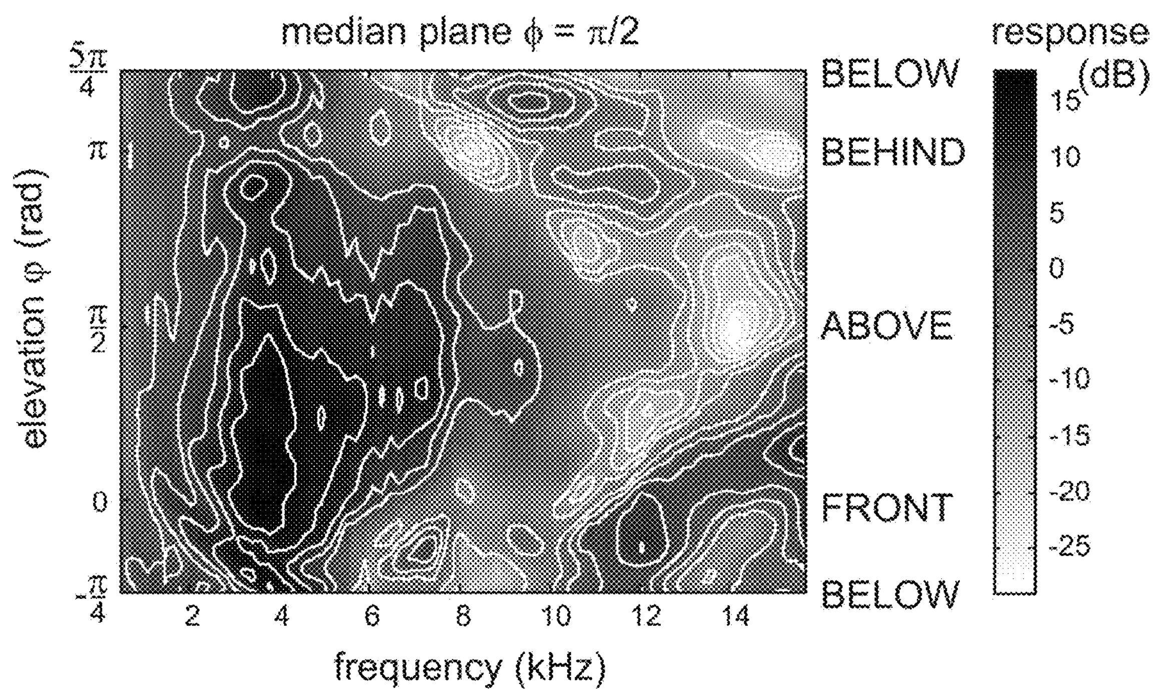
FIG. 4 shows an example of a monaural (left ear) head-related transfer function (HRTF) of a particular person along the median plane, whereby different intensity (grayscale) is used to indicate different values. Iso-response contours are shown in white curved lines.

In the context of the present invention, with "head-related transfer function" or "HRTF" is meant the ensemble of binaural spectral functions (as shown in FIG. 4 for the left ear only, for the median plane), each spectral function (the values corresponding with each horizontal line in FIG. 4) representing the spectral filtering characteristics imposed by the body, the head, and the left/right ear on sound coming from a particular direction.

Where in the present invention reference is made to "position of an object", what is meant is a particular location in a 3D-space, as can for example be indicated by specific X,Y,Z coordinates with respect to the world frame of reference, but other coordinates may also be used.

Where in the present invention reference is made to "orientation of an object", what is meant is the orientation in a 3D-space which can be expressed for example by 3 Euler angles with respect to the world frame of reference, but other coordinates may also be used.

Where in the present invention reference is made to "direction of the sound source with respect to the head", what is meant is a particular direction with respect to the head reference frame as used in standard HRTF and ITDF measurements. This direction is typically expressed by two angles: a lateral angle $\phi$ and an elevation angle $\varphi$ as shown for example in FIG. 2, whereby the lateral angle $\phi$ is a value in the range of 0 to $\pi$, and the elevation angle $\varphi$ is a value in the range of 0 to $2\pi$.

In the present invention reference is made to the "orientation sensor" or "orientation unit" instead of a (6D) position sensor, because we are mainly interested in the orientation of the head and the (X, Y, Z) position information is not really required to estimate the HRTF and ITDF. Nevertheless, if available, the (X,Y,Z) position information may also be used by the algorithm to ascertain that the head's center of rotation does not change too much during the data acquisition.

In this document, the terms "average HRTF" and "generalized HRTF" are used as synonyms, and refer to a kind of averaged or common HRTF of a group of persons.

In this document, the terms "average ITDF" and "generalized ITDF" are used as synonyms, and refer to a kind of averaged or common ITDF of a group of persons.

In this document, the terms "personalized HRTF" and "individualized HRTF" are used as synonyms, and refer to the HRTF of a particular person.

In this document, the terms "personalized ITDF" and "individualized ITDF" are used as synonyms, and refer to the ITDF of a particular person.

The inventors were confronted with the problem of finding a way to personalize the HRTF and ITDF in a simple way (for the user), and at a reduced cost (for the user).

The proposed method tries to combine two (contradictory) requirements:

(1) the need for a sufficient collection of informative data so that the ITDF and HRTF can be sufficiently accurately estimated (or in other words: the true ITDF and HRTF can be sufficiently accurately approximated), and (2) the limitation that the procedure (or more precisely: the part where the data is captured) can be performed at home and is not too difficult for an average user.

The inventors came up with a method that has two major steps:

1) a first step of data capturing, which is simple to perform, and uses hardware which is commonly available at home: a sound reproducing device (e.g. any mono or stereo chain or MP3-player or the like, connectable to a loudspeaker) and an orientation sensor (as is nowadays available for example in smartphones). The user only needs to buy a set of in-ear microphones, 2) a second step of data processing, which can be performed for example on the same smartphone, or on another computing device such as a desktop computer or a laptop computer, or even in the cloud. In the second step an algorithm is executed that is tuned to the particulars of the data capturing step, and which takes into account that the spectral characteristics of the loudspeaker and of the microphones may not be known, and that the position of the person relative to the loudspeaker may not be known, and that the position/orientation of the orientation unit on the person's head may not be known (exactly) and that the accuracy of the orientation data provided by the orientation unit may not be very accurate (for example has a tolerance of +/−10°).

The ITDF and HRTF resulting from this compromise may not be perfect, but are sufficiently accurate for allowing the user to (approximately) locate a sound source in 3D-space, in particular in terms of discerning front from back, thus creating a spatial sensation with an added value to the user. Furthermore, the end-user is mainly confronted with the advantages of the first step, and is not confronted with the complexity of the data processing step.

In the rest of this document, first a prior art solution will be discussed with reference to FIG. 5. Then the data capturing step of the present invention will be explained in more detail with reference to FIG. 6 to FIG. 8. Finally the data processing step of the present invention will be explained in more detail with reference to FIG. 9 to FIG. 16.

I. Known Solution

Figure 5:
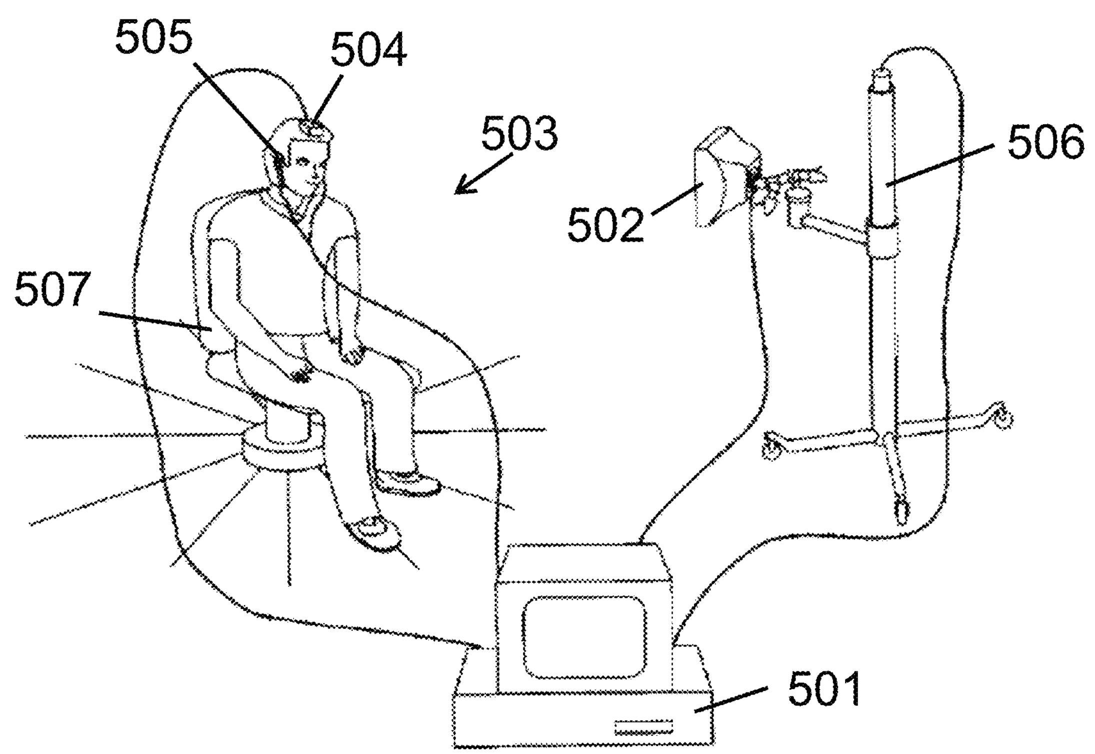
FIG. 5 shows an arrangement for measuring a HRTF outside of an anechoic chamber, known in the prior art.

FIG. 5 is a copy of FIG. 1 of U.S. Pat. No. 5,729,612A, and illustrates an embodiment of a known test-setup, outside of an anechoic room, whereby a person 503 is sitting on a chair, at a known distance from a loudspeaker 502, which is mounted on a special support 506 for allowing the loudspeaker to be moved in height direction. A left and right audio signal is captured by two in-ear microphones 505 worn by the person. Head movements of the person are tracked by a position sensor 504 mounted on top of the head of the person who is sitting on a chair 507 which can be oriented in particular directions (as indicated by lines on the floor). The microphones 505 and the position sensor 504 are electrically connected to a computer 501 via cables. The computer 501 sends an acoustic test signal to the loudspeaker 502, and controls the vertical position of the loudspeaker 502 using the special support 506.

The data will be processed in the computer 501, but the document is silent about how exactly the ITDF and HRTF are calculated from the measured audio signals and position signals. The document does mention a calibration step to determine a transfer characteristic of the loudspeaker 502 and microphones 505, and the method also relies heavily on the fact that the relative position of the person 503 and the loudspeaker 502 are exactly known.

Figure 6:
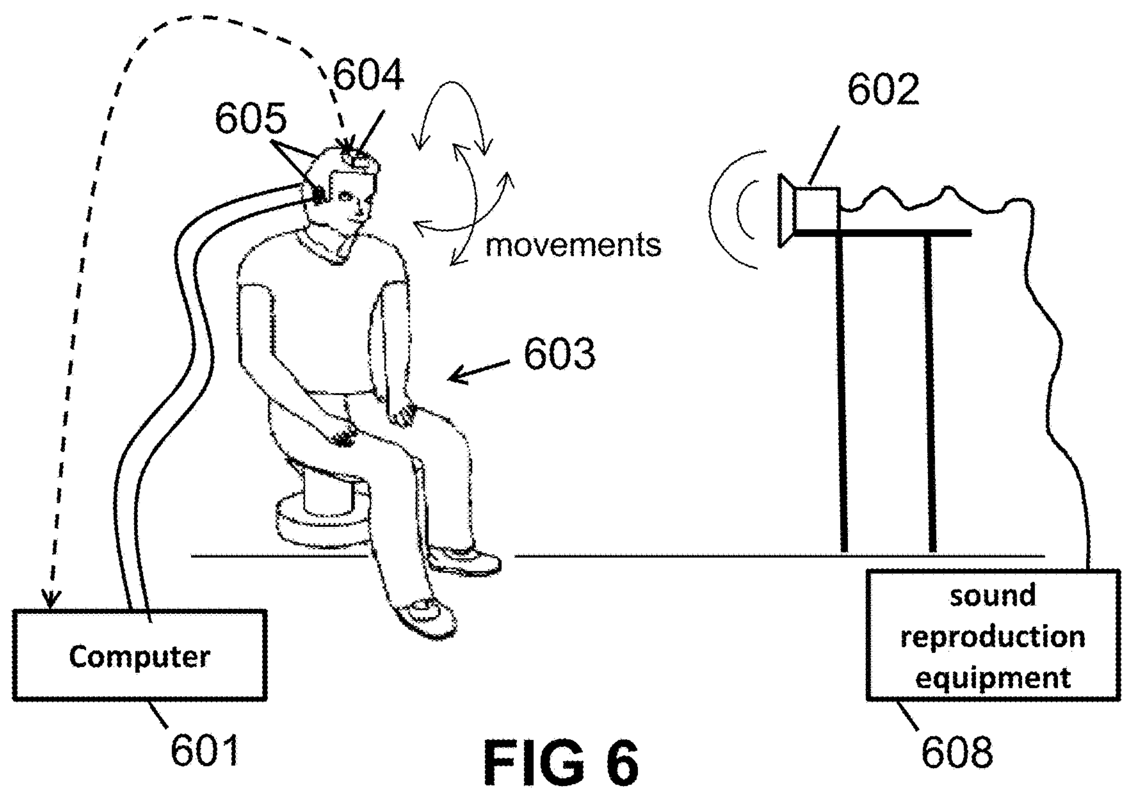
FIG. 6 shows a first example of a possible hardware configuration for performing one or more steps of a method according to the present invention, whereby data capturing is performed by a computer electrically connected to in-ear microphones, and whereby orientation data is obtained from a sensor unit present in a smartphone.
Figure 7:
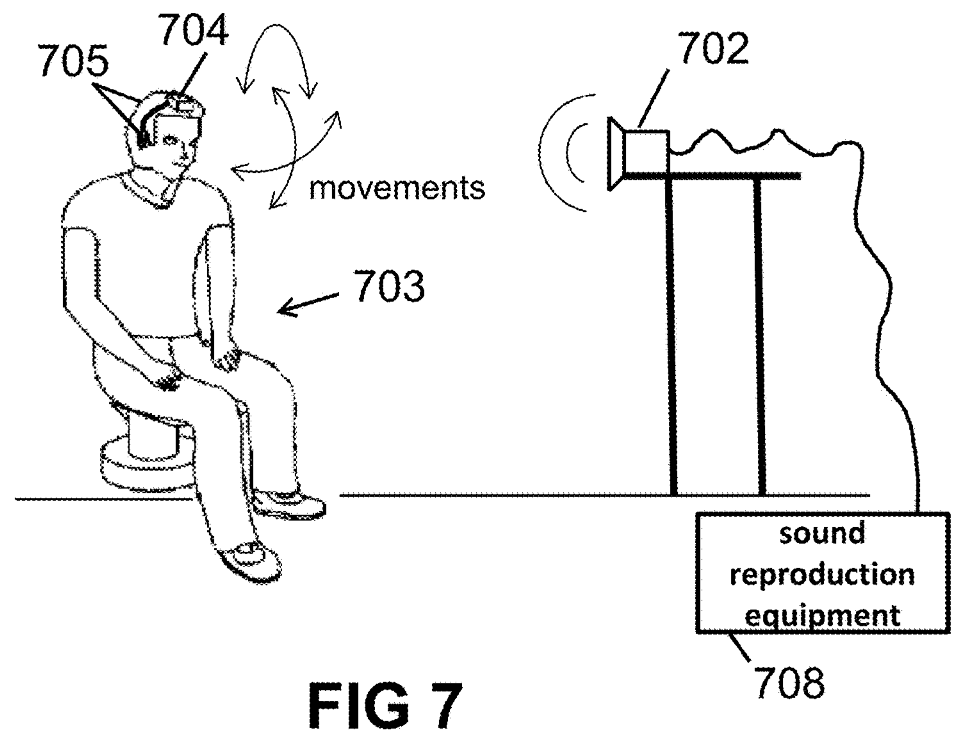
FIG. 7 shows a second example of a possible hardware configuration for performing one or more steps of a method according to the present invention, whereby data capturing is performed by a smartphone electrically connected to in-ear microphones, and whereby orientation data is obtained from a sensor unit present in the smartphone, and whereby the data processing is also performed by the smartphone.
Figure 8:
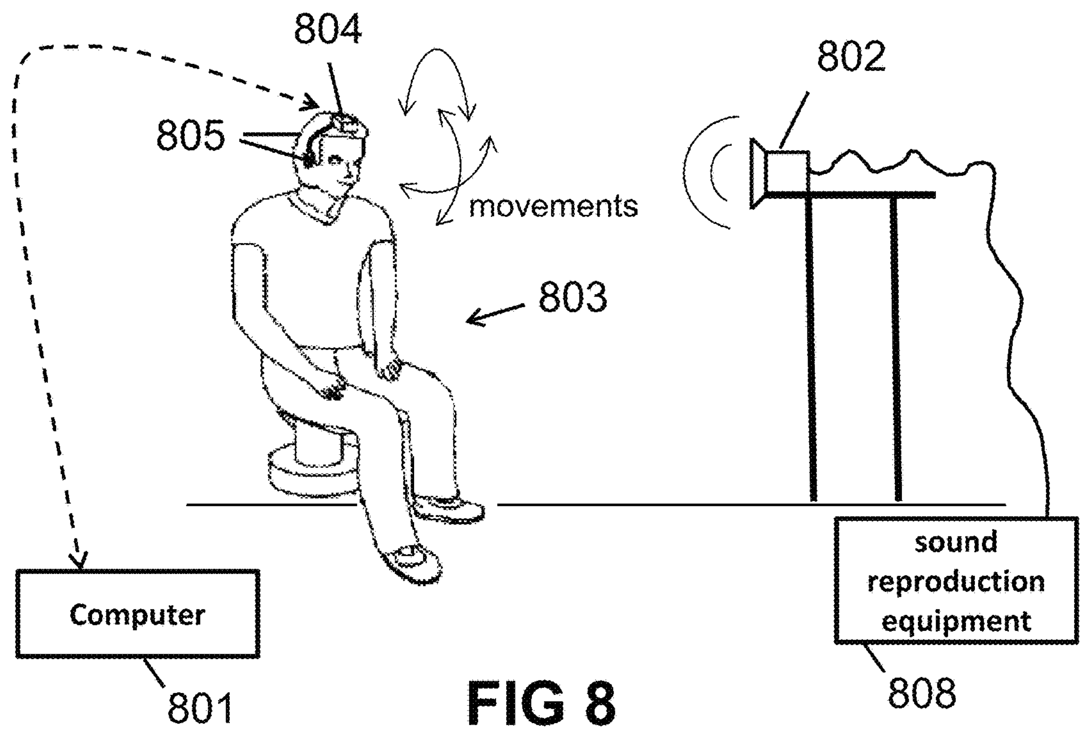
FIG. 8 shows a third example of a possible hardware configuration for performing one or more steps of a method according to the present invention, whereby data capturing is performed by a smartphone electrically connected to in-ear microphones, and whereby orientation data is obtained from a sensor unit present in the smartphone, and whereby the data processing is off-loaded to a computer or to "the cloud".

II. Data Capturing:

FIG. 6 to FIG. 8 show three examples of possible test-arrangements which can be used for capturing data according to the present invention, the present invention not being limited thereto.

In the configurations shown, a sound source 602, 702, 802, for example a loudspeaker is positioned at an unknown distance from the person 604, 704, 804, but approximately at the same height as the person's head. The loudspeaker may for example be placed on the edge of a table, and need not be moved. The person 603, 703, 803 can sit on a chair or the like. The person is wearing a left in-ear microphone in his/her left air, and a right in-ear microphone in his right ear. An orientation unit 604, 704, 804 is mounted to the head of the person, preferably on top of the person's head, for example by means of a head strap (not shown) or belt or stretchable means or elastic means. The orientation unit may for example comprise an accelerometer and/or a gyroscope and/or a magnetometer, but any other suitable orientation sensor can also be used. The orientation unit may be comprised in a portable device, such as for example a smartphone. It is an advantage of embodiments of the present invention that the position and orientation of the orientation unit with respect to the head need not to be known exactly, and that the orientation sensor need not be very accurate (for example a tolerance of +/−10° may well be acceptable), as will be explained further.

During the data capturing step, an acoustic test signal, for example a prerecorded audio file present on a CD-audio-disk, is played on a sound reproduction equipment 608, 708, 808 and rendered via the (single) loudspeaker 602, 702, 802. Alternatively two or even more loudspeakers may be used. The acoustic test signal comprises a plurality of acoustic stimuli for example clicks having a predefined duration and predefined spectral content. In the context of this invention, for ease of explanation, the terms "click" and "stimulus" are used interchangeably and both refer to the acoustic stimulus. Preferably acoustic stimuli of a short duration and with a broadband spectrum are used, but the invention is not limited thereto, and other signals, for example short pure tones may also be used.

Figure 2:
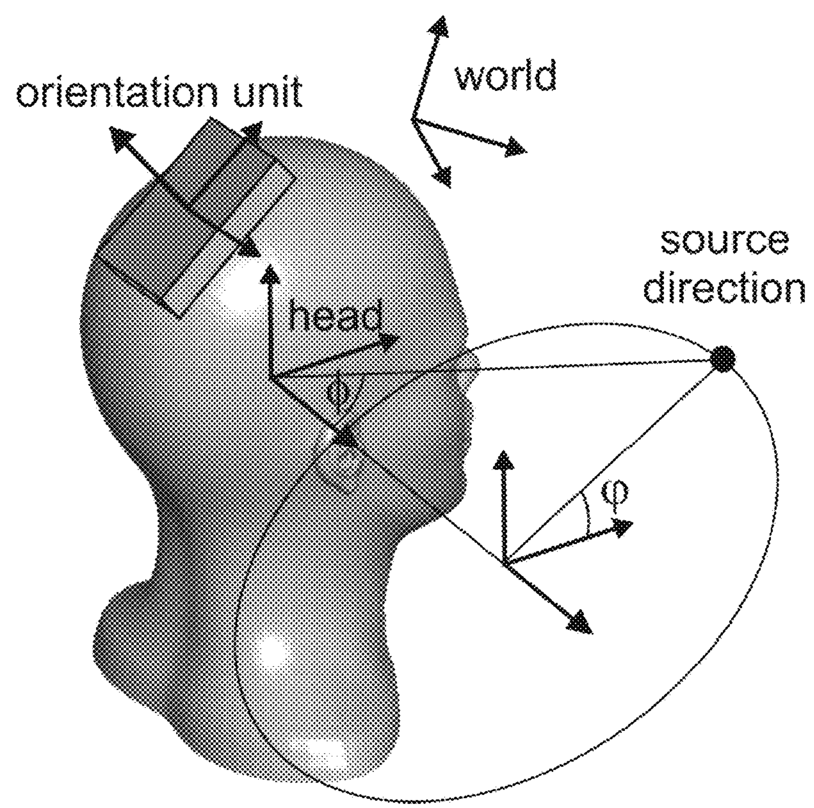
FIG. 2 is a schematic representation of different frames of reference as may be used in embodiments of the present invention: a reference frame of the orientation unit mounted to the head, a world reference frame, which is any frame fixed to the world as used by the orientation unit, and a reference frame fixed to the head, which is defined as the head reference frame used in standard HRTF and ITDF measurements (see also FIG. 3 and FIG. 4). The source direction relative to the head is defined by a lateral angle $\phi$ and an elevation $\varphi$.

While the acoustic test signal is being rendered via the loudspeaker, the person needs to turn his/her head gently in a plurality of different orientations (see FIG. 2).

The acoustic stimuli of interest, e.g. clicks are captured or recorded via the left and right in-ear microphones 605, 705, 805, and for each recorded stimulus, orientation data indicative for the orientation of the head at the moment of the stimulus arriving at the ears, is also captured or recorded.

In the configuration of FIG. 6, the in-ear microphones 605 are electrically connected (via relatively long cables) to the computer 601 which captures the left and right audio data, and which also retrieves orientation information from the orientation sensor unit 604 (wired or wireless). The computer 601 can then store the captured information as data sets, each data set comprising a left audio sample (Li) originating from the left in-ear microphone and a right audio sample (Ri) originating from the right in-ear microphone and orientation information (Oi) originating from the orientation unit. The data sets may be stored in any suitable manner, for example in an interleaved manner in a single file, or as separate files.

A disadvantage of the configuration of FIG. 6 is that the in-ear microphones and possibly also the orientation sensor, are connected to the computer via relative long cables, which may hinder the movements of the person.

The orientation unit 604 may be comprised in a portable device such as for example a smartphone, or a remote controller of a game console, which may comprise a programmable processor configured with a computer program for reading orientation data from the orientation sensor, and for transmitting that orientation data to the computer 601, which would be adapted with a computer program for receiving said data. The orientation data can for example be transmitted via a wire or wireless (indicated by dotted line in FIG. 6). In the latter case a wire between the computer 601 and the sensor unit 604 can be omitted, which is more convenient for the user 603.

The setup of FIG. 7 can be seen as a variant of the setup of FIG. 6, whereby the orientation unit 704 is part of a portable device, e.g. a smartphone, which has a programmable processor and memory, and which is further equipped with means, for example an add-on device which can be plugged in an external interface, and which has one or two input connectors for connection with the left and right in-ear microphones 705 for capturing audio samples arriving at the left and right ear, called left and right audio samples. Since the sensor unit 704 is embedded, the processor can read or retrieve orientation data from the sensor 704, and store the captured left and right audio samples, and the corresponding, e.g. simultaneously captured orientation information as a plurality of data sets in the memory.

A further advantage of the embodiment of FIG. 7, is that the cables between the portable device and the in-ear microphones 705 can be much shorter, which is much more comfortable and convenient for the user 703, and allows more freedom of movement. The audio signals so captured typically also contain less noise, hence the SNR (signal to noise ratio) can be increased in this manner, resulting ultimately in a higher accuracy of the estimated ITDF and HRTF.

If the second step, namely the data processing is also performed by the portable device, e.g. the smartphone, then only a single software program product needs to be loaded on the smartphone, and no external computer is required.

FIG. 8 is a variant of the latter embodiment described in relation to FIG. 7, whereby the second step, namely the data processing of the captured data, is performed by an external computer 801, but the first step of data capturing is still performed by the portable device. The captured data may be transmitted from the portable device to the computer, for example via a wire or wireless, or in any other manner. For example, the portable device may store the captured data on an non-volatile memory card or the like, and the user can remove the memory card from the portable device after the capturing is finished, and insert it in a corresponding slot of the computer 801. The latter two examples both offer the advantage that the user 803 has much freedom to move, and is not hindered by cables. The wireless variant has the additional advantage that no memory card needs to be exchanged. In all embodiments of FIG. 8, a first software module is required for the portable device to capture the data, and to store or transmit the captured data, and a second module is required for the computer 801 to obtain, e.g. receive or retrieve or read the captured data, and to process the captured data in order to estimate a personalized ITDF and a personalized HRTF.

The following sections A to G are applicable to all the hardware arrangements for capturing the data sets comprising left audio, right audio and orientation information, in particular, but not limited to the arrangements shown in FIG. 6 to FIG. 8, unless specifically stated otherwise.

In these sections, reference will be made to "clicks" as an example of the audio stimuli of interest, for ease of explanation, but the invention is not limited thereto, and other signals, for example short pure tones may also be used, as described above.

In these sections, reference will be made to "smartphone" as an example of a portable device wherein the orientation sensor unit is embedded, but the invention is not limited thereto, and in some embodiments (such as shown in FIG. 6), a stand-alone orientation sensor unit 604 may also work, while in other embodiments (such as shown in FIG. 8) the portable device needs to have at least audio capturing means and memory, while in yet other embodiments (such as shown in FIG. 7) the portable device further needs to have processing means.

A. Simultaneous Capturing of Audio and Orientation

It is important that the left and right audio samples, i.e. the recorded stimuli, and the orientation information are corresponding. Ideally, the left and right audio signals are "simultaneously sampled" (within the tolerance margin of a clock signal), but there is some tolerance of when exactly the orientation data is measured. What is important for the present invention is that the orientation data is representative for the 3D orientation of the head at the moment when the audio samples are captured. As an example, assuming that the head is being turned gently during the capturing step, (for example at an angular speed of less than 60° per second), and that the acoustic stimuli have a relatively short duration (for example less than 5.0 ms), it does not really matter whether the orientation data is retrieved from the sensor at the start or at the end of the acoustic stimulus, or during the stimulus, as it would result in an angular orientation error of less than 60°/200, which is about ⅓ of 1°, which is well acceptable.

B. The Hardware Setup

During the data capturing, a distance between the loudspeaker 602, 702, 802 and the person 603, 703, 803 is preferably a distance in the range of 1.0 to 2.0 m, e.g. in the range of 1.3 to 1.7 m, e.g. about 1.5 m, but the exact distance need not be known. The loudspeaker should be positioned approximately at about half the height of the room. The head of the person should be positioned at approximately the same height as the loudspeaker. The loudspeaker is directed to the head. Assuming a head width of approx. 20 cm, a source positioned at 1.5 m distance, the ears would be bg tan(0.1/1.5)rad=3.8° off-axis. Moreover, assuming that the person's head is mostly rotated and not or only minimally displaced, the sound wave can be approximated by a planar wave and consequently, for most loudspeakers, the main lobe is broad enough to contain the head fully at the frequencies of interest, for the intensity difference to be limited.

In the examples described below, use is made of a single loudspeaker, but of course the invention is not limited thereto, and multiple loudspeakers positioned at different points in space, may also be used. For example, the sound reproduction system may be a stereo system, sending acoustic stimuli alternatingly to the left and right speaker.

C. Possible Procedure for the End-User

The procedure is preferably executed in a relatively quiet room (or space). The person may be provided with an audio-CD containing an acoustic test signal as well as written or auditory instructions. The user may perform one or more of the following steps, in the order mentioned, or in any other order:

1. Placing the loudspeaker on an edge of a table (but other suitable places could also be used). Configuring the sound-reproduction device (e.g. stereo-chain) so that only one of the loudspeakers is producing sound, (or both are producing sound, but not at the same time),
2. Listening to the instructions on the audio-CD, which may e.g. comprise instructions of how often and/or how fast and/or when the user has to change his/her head orientation,
3. Plug the left in-ear microphone in the left ear, and the right in-ear microphone in the right ear, and connect the microphones to the smartphone (in FIG. 6: to the external computer 601),
4. Download a suitable software application (typically referred to as "app") on the smartphone, and run the app, (this step is not applicable to FIG. 6)
5. Place the smartphone (or sensor in FIG. 6) on top of the head, and fix its position e.g. using the specially designed head strap or another fastening means, for allowing the smartphone to capture and/or stream and/or record any head orientations and/or movements and/or positions,
6. Position yourself (e.g. sit or stand) at a distance of approximately 1.5+/−0.5 m from the loudspeaker. Make sure that the room is sufficiently large, and that no walls or objects are present within a radius of about 1.5 meters from the loudspeaker and from the person (to avoid reflections),
7. When the acoustic stimuli, e.g. click-sounds are heard, turn the head gently during a predefined period (e.g. 5 to 15 minutes, e.g. about 10 minutes) in all directions, e.g. left to right, top to bottom, etc. (what is meant is that the position of the head (X, Y, Z) should remain unchanged, and only the orientation of the head (e.g. 3 Euler angles with respect to the world reference frame) is changed, see FIG. 2, to change the incident angle of the sound relative to the head). Between the series of acoustic stimuli (e.g. clicks—, guidelines may be given about how to move. For example, the instruction may be given at a certain moment to turn the head a quarter turn (90°), or a half turn (180°) so that the lateral hemisphere and sound coming from "behind" the user is also sampled.
8. After the test is completed, the user will be asked to remove the smartphone from the head and to stop capturing or recording by the "app".

A personalized ITDF and a personalized HRTF is then calculated, e.g. on the smartphone itself (see FIG. 7), in which case the captured data need not be transferred to another computer, or is calculated on another computer, e.g. in the cloud, in which case the captured data needs to be transferred from the "app" to the computer or network. The IDTF and HRTF are then calculated using a particular algorithm (as will be explained below), and the resulting IDTF and HRTF are then made available, and are ready for personal use, for example in a 3D-game environment, or a teleconferencing environment, or any other 3D-VAS application.

Many variants of the procedure described here above are possible, for example:

- the transmission of the captured data may already start before all measurements are taken,
- the calculations may already start before all captured data is received,
- rather than merely capturing the data, the smartphone may also analyze the data, for example the orientation data, to verify whether all directions have been measured, and could render for example an appropriate message on its own loudspeaker with corresponding instructions, e.g. to turn the head in particular directions, etc.

D. The Room and the Acoustic Test Signal

Different test stimuli may be used for the determination of the ITDF and HRTF. In one embodiment, it is proposed to use broadband stimuli (referred to herein as "clicks"), whereby the frequency varies from 5 kHz to 12 kHz. In this part of the frequency spectrum, the HRTF varies the most (see examples in FIG. 4), the invention not being limited thereto.

Traditionally HRTF measurements are performed using fairly long signals (e.g. about 2 to 5 seconds). Traditionally HRTF measurements are performed in a (semi-) anechoic chamber. Here, the walls are covered with sound-absorbing material, so that the secondary reflections on the walls and other objects are reduced to a minimum. Since the method of the present invention is to be performed at home, these reflections cannot be eliminated in this way. Instead, stimulus signals, e.g. clicks are used having a duration that is short enough to prevent that the direct sound and the reflected sound (against walls and/or objects in the room) overlap (for a typical room).

Suppose in an exemplary arrangement the speaker is at a height Hls of 1.40 m, and that the persons head is at a height Hhead of 1.40 m, and that the distance L between the person and the loudspeaker is L=1.4 m, and that the height of the room is at least 2.8 m, so that the reflection on the ground arrives before reflection on the ceiling, then the difference in traveled distance between the direct path and the first reflection (on the ground), is:

$$\Delta x=\sqrt{(H_{head}+H_{ls})^2+L^2}-\sqrt{(H_{head}-H_{ls})^2+L^2}=1.7\text{ m}$$

and thus the reflected signal needs (1.7 m)/(344 m/s)=about 4.94 ms longer to reach the head.

Thus by taking a stimulus signal with a duration shorter than 4.94 ms, for example at most 4.80 ms, or at most 4.50 ms, or at most 4.25 ms, or at most 4.0 ms, or at most 3.5 ms, or at most 3.0 ms, or at most 2.5 ms, or at most 2.0 ms, or at most 1.5 ms, or at most 1 ms, the direct signal can be easily separated from the subsequent reflections by using a window mask (which is a technique known per se in the art). In what follows a stimulus duration of 4.80 ms will be assumed, although the present invention is not limited hereto, and other pulse durations longer than 4.80 ms, or shorter than 4.8 ms, may also be used, depending on the room characteristics. It is also contemplated that more than one acoustic test signal may be present on the audio-CD, and that the user can select the most appropriate one, depending on the room characteristics.

After each stimulus, e.g. click, it is necessary to wait long enough so that all reflections in the environment (the reverberations) are sufficiently extinguished. This duration depends on the chamber and the objects therein. The so-called reverberation time, is defined as the time required to ensure that the echo signal intensity has dropped by 60 dB compared to the original signal. Tests in various chambers will have to show which inter-pulse time is necessary so that the echo-signal is sufficiently attenuated. From preliminary tests, it is expected that an inter-pulse time of about 400 ms would suffice, but the invention is not limited hereto, and other inter-pulse times larger or smaller than 400 ms may also be used, for example an inter-pulse time of about 100 ms, e.g. about 200 ms, e.g. about 300 ms, e.g. about 500 ms, e.g. about 600 ms, e.g. about 800 ms, e.g. about 1000 ms. It is advantageous to keep the inter-click time as small as possible, to increase the number of clicks during the total test-time (e.g. about 10 minutes), or stated differently, to lower the total test time for a given number of clicks. If an audio-CD or DVD is provided, it may also be possible to provide multiple audio test signals (e.g. audio-tracks), with different pulse duration and/or different inter-pulse times and/or different total duration of the test, and the procedure may include a step of determining a suitable audio-test-file, e.g. depending on the room wherein the test is performed. One possible implementation on an audio-CD would be that the instructions are present on a first audio-track, where the user is informed about the different options, and whereby the user can select an appropriate test signal, depending on his/her room characteristics and/or desired accuracy (the less samples are taken, the faster the data capturing and processing can be, but the less accurate the resulting ITDF and HRTF are expected to be).

Subsequent stimuli need not be identical, but may vary in frequency content and/or duration. If subsequent stimuli were chosen such that they cover a different frequency band, which is clearly separable, then such a test signal design would allow one to reduce the inter-stimulus time, and hence to improve the data acquisition.

In the embodiment where more than one loudspeakers is used, for example two in case of a stereo signal, each of the loudspeakers is positioned at a different point in space, and each of the loudspeakers renders a different acoustic test signal (using stereo input), comprising different stimuli (different frequency spectrum and/or the stimuli alternating (stimulus/no stimulus) between loudspeakers), in order to be able to separate the stimuli upon reception and to identify the loudspeaker from where it originated. It is an advantage that the present invention works for a large number of room settings, without the need for special chairs or special support for mounting the loudspeaker, etc, without requiring the loudspeaker to be repositioned during the data capturing, without knowing the exact position of the loudspeaker, and without knowing the filter characteristic of the loudspeaker.

E. Measuring the Head Orientation

In order to determine HRTF and ITDF, it is essential to know the direction where the sound is coming from, relative to the head. According to the present invention, this relative orientation can be obtained by making use of one or more orientation sensors, e.g. an accelerometer (measuring mainly an orientation relative to the gravitational axis)), a gyroscope (measuring rotational movements), a magnetometer (measuring an angle relative to the Earth's magnetic field), but other orientation sensors may also be used. The orientation unit is fixed to the head, possibly in a predefined manner, but the exact positioning of the orientation unit with respect to the head reference frame need not be known beforehand.

It is an advantage of the present invention that potential inaccuracy of the orientation sensor unit is addressed by not only relying on the information obtained from the orientation sensor, but by also taking into account the audio signals when determining the head orientation, as will be explained in more detail further below, when describing the algorithm.

It is an advantage that the head movements are performed by the person himself, in a way which is much more free and convenient than in the prior art. Moreover, in some embodiments of the invention, the person is not hindered by cables running from the in-ear microphones to the external computer.

F. Hardware

Although not all smartphones allow capturing or recording of stereo-audio signals via a stereo or two mono input connectors, there are extensions that allow stereo recording via a USB port, for example "TASCAM iM2 Channel Portable Digital Recorder", commercially available. Although this extension has microphones which cannot be inserted in an ear, this example demonstrates that the technology is at hand to make such a dedicated extension, for example by removing the microphones and by providing two audio connectors, wherein the in-ear microphones can be plugged. This is only one example of a possible portable device which can be used in the embodiments of FIG. 7 and FIG. 8.

Technology for determining orientation information of a portable device is also available. Consider for example the "Sensor Fusion App". This application shows that technology for retrieving orientation information from portable devices with embedded orientation sensors, such as for example accelerometers (for measuring mainly an orientation relative to the gravitational axis), a gyroscope (for measuring rotational movements) and/or a magnetometer (for measuring direction relative to Earth's magnetic field) is available.

G. Providing the Captured Data to the Computing Means

After capturing and/or recording and/or streaming the left and right audio signals from the microphones (also referred to as the binaural audio data), and the corresponding head orientations (from the orientation unit), the processing of the captured data may be performed by a processor in the portable device (e.g. smartphone) itself, or on a remote computer (e.g. in the cloud, or on a desktop or laptop or game console) to which the data is transmitted or streamed or provided in any other way (e.g. via an exchangeable memory card).

III. Data Processing:

The data processing step of the present invention will be explained in more detail with reference to FIG. 9 to FIG. 16.

Figure 9:
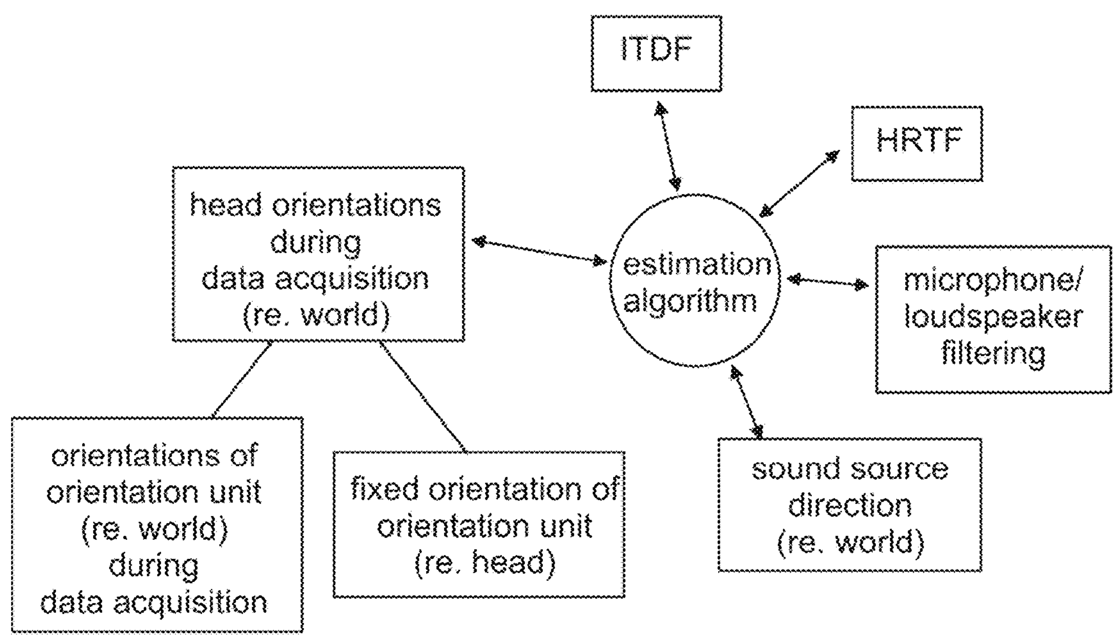
FIG. 9 illustrates the variables which are to be estimated in the method of the present invention, hence illustrates the problem to be solved by the data processing part of the algorithm used in embodiments of the present invention.

FIG. 9 is a schematic diagram illustrating the unknowns which are to be estimated. In other words, this figure illustrates the problem to be solved by the data processing part of the algorithm used in embodiments of the present invention.

As can be seen from FIG. 9, the personal (or individualized) ITDF and the personal (or individualized) HRTF are not the only sets of variables to be determined. The head orientation during the data acquisition is unknown in the setups as shown in FIG. 6 to FIG. 8, because the orientation of the orientation unit with respect to the head reference frame is not precisely known, and because the head orientation at the time of reception of each acoustic stimulus (e.g. at each click) is possibly not precisely known, based on the sensor information alone, hence considered unknown. Also, the direction of the sound source is unknown. In addition, the spectral characteristic of the loudspeaker and microphone combination may be unknown, since the user may use any available loudspeaker. The transfer characteristic of the microphones may be known beforehand, especially when the microphones are for example sold in a package along with a CD, but even then, the parameters of the loudspeaker are not known. In cases where the transfer characteristic of the loudspeaker and the microphones are known, the algorithm may use them, but that is not absolutely necessary.

It was found that this large number of unknowns cannot be estimated with sufficient accuracy unless all data is combined and estimated together. This is another advantageous aspect of the present invention. For example, the raw orientation and movement data originating from the orientation sensor(s) (for example embedded in a smartphone) might not permit to determine the head orientation with sufficient accuracy, inter alia because the position/orientation of the smartphone with respect to the head is not fully known, and in addition, because it may be quite difficult to accurately estimate the head orientation, given the limited accuracy of the orientation sensor. The inventors have however realized that the orientation information is also contained in the left and right audio data, despite the fact that it cannot be readily extracted therefrom because the HRTF and ITDF and the sound source direction are not fully known.

Briefly stated, in a preferred embodiment, the solution presented by the present invention is based on an iterative process, which starts from an initial estimate of the smartphone orientation during the data acquisition, the generalized HRTF and ITDF, and an estimate of the filter characteristic of the loudspeaker and of the microphones. During the iteration steps, the information from the audio measurements is combined with a priori knowledge of realistic HRTFs and ITDFs. Indeed, since the HRTF and ITDF are not random functions, their degrees of freedom are limited. The structure of possible HRTFs and ITDFs, i.e. which HRTF and ITDF is likely to occur, and which one is not, can be deduced from existing databases of measured HRTFs and ITDFs (which were measured for example in an anechoic room). Based for example on the database of HRTFs and ITDFs, a particular coefficient basis can be chosen such that the number of coefficients necessary to describe the HRTF and ITDF into sufficient detail is greatly reduced, which reduces the number of coefficients that need to be estimated. The same goes for the combined microphone/loudspeaker filter. The unknowns shown in the FIG. 9 may be iteratively optimized, such that the thus obtained solution corresponds best with the captured data sets. This will be explained in more detail further.

In case of multiple loudspeakers, for example two in the case of a stereo signal (or two synchronized non-overlapping mono-signals), the recorded stimuli can be identified as originating from one of the loudspeakers thanks to the choice of the applied acoustic test signal, and hence one obtains two separate data sets, each corresponding with one of the loudspeakers. These data sets can then be used together as input for the algorithm to estimate the direction of loudspeaker proper, and the other unknowns of the problem shown in FIG. 9. The fact that one has two "points of reference" that do not change positions, may improve the estimates of the head orientation, and consequently the estimates of the ITDF and HRTF.

Figure 10:
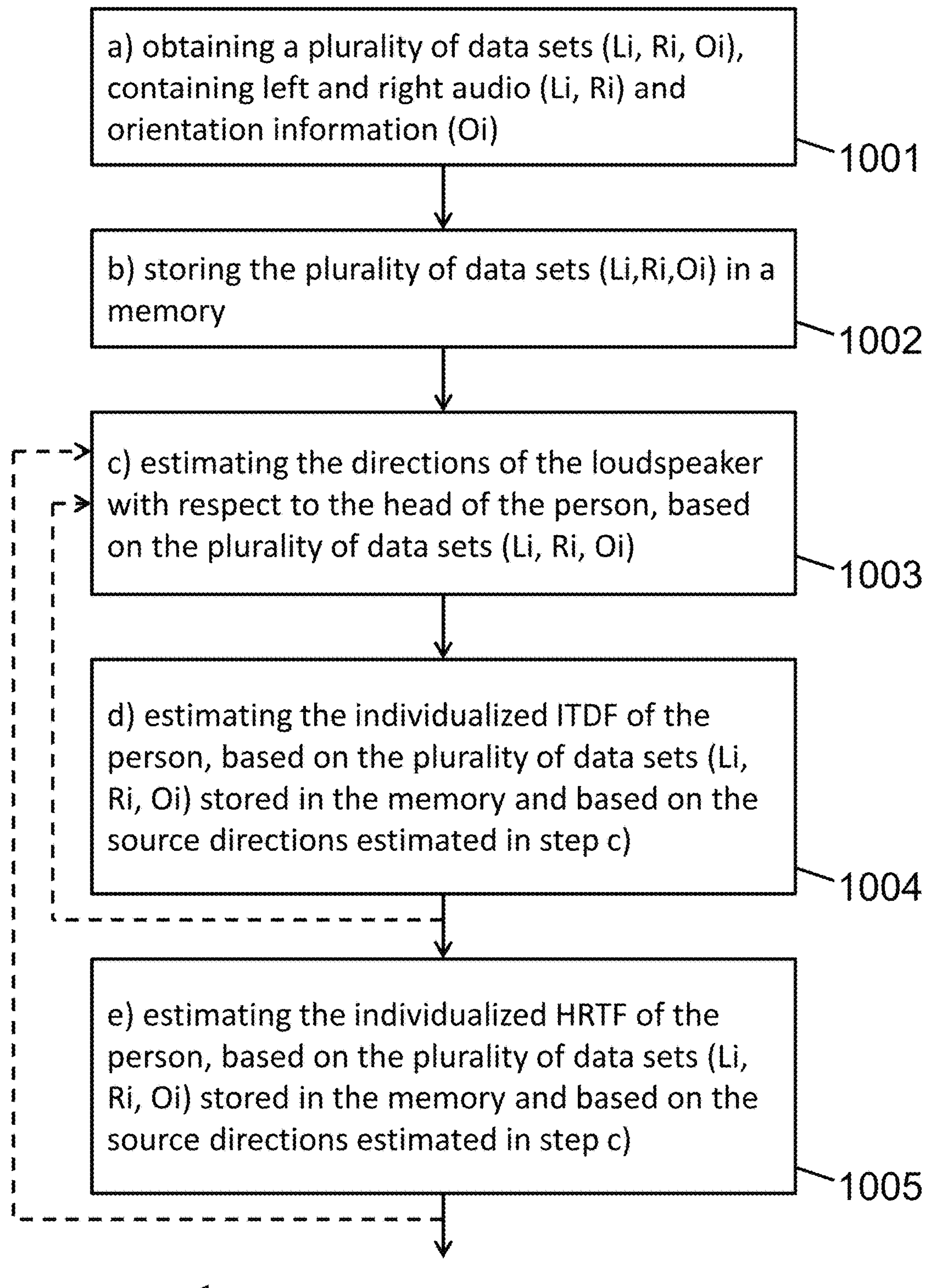
FIG. 10 shows the main steps of the algorithm proposed by the present invention.

The Algorithm:

FIG. 10 shows the main steps of the algorithm proposed by the present invention.

In a first step 1001, further also referred to as "step a", a plurality of data sets is obtained, each data set comprising a left and right audio sample, and corresponding orientation data.

With "audio sample" is meant for example a short portion of the audio waveform received by the left in-ear microphone, which portion contains a filtered version of the acoustic stimulus sent by the loudspeaker. The received stimulus waveform may be preceded by a portion of silence, and the portion may be truncated for example at 4.8 ms after the start of the stimulus, to avoid reflections, but this is just an example.

It is noted that the data sets can be "obtained" and/or "captured" and/or "stored" in memory in many different ways, for example as a single interleaved file or stream, or as three separate files or streams (e.g. a first containing the left audio samples, a second containing the right audio samples, and a third containing the orientation data, whereby each file may comprise synchronization information, for example in the form of time stamps), or as individual data packets, each data packet containing a left audio sample, and a right audio sample and orientation data with respect to a reference system fixed to the world, but other ways may also be possible, and the present invention is not limited to any of these ways.

Depending on which hardware device performs the capturing of the data, and which hardware device performs the calculations, (e.g. a stand-alone computer, or a network computer, or a smartphone, or any other computing means), "obtaining" can mean: "receiving" data captured by another device (e.g. by a smartphone, see e.g. FIG. 8), for example via a wired or wireless interface, or "retrieving" or "reading" data from an exchangeable memory card (on which the data was stored by the capturing device, and then connected to the computing device), or data transfer in any other way. But if the device that captured the data is the same as the device that will perform the calculations, "obtaining" may mean "capturing the data sets", either directly, or indirectly, and no transmission of the captured data to another device is necessary. It is thus clear that a method or computer program product directed to the processing of the data, need not necessarily also capture the data.

In a second step 1002, also referred to herein as "step b", the data sets are stored in a memory. The memory may be a non-volatile memory or a volatile memory, e.g. RAM or FLASH or a memory card, etc. It is contemplated that if the algorithm could be performed in real-time (e.g. on a fast processing means, or by using a long delay between clicks), and if a single execution of each step would suffice to calculate a sufficiently accurate personalized ITDF and HRTF, that all the data need not necessarily be present in the memory at the same time, but this is rather exceptional. Typically all the data sets will be stored in a memory, albeit that not all the data needs to be simultaneously in RAM, but it may.

In a third step 1003, also referred to herein as "step c", the relative directions of the loudspeaker with respect to the head of the person will be estimated, based on the plurality of data sets, whereby not only the orientation sensor data is used, but whereby also relevant spatial information (on the sound source direction relative to the head) is extracted from the audio data, making use of a transfer function which relates acoustic cues to spatial information of the sound source. Different transfer functions can be used, the ITDF and/or the HRTF, or any other function that can be derived from these functions, such as e.g. functions based on the Interaural level difference (ILD), Interaural Intensity difference (IID) or the Interaural Spectral Difference (ISD), known per se in the art.

In a fourth step 1004, also referred to herein as "step d", an individualized ITDF is calculated, based on the plurality of data sets, and taking into account the estimated relative directions estimated in step c).

In a fifth step 1005, also referred to herein as "step e", an individualized HRTF is calculated, based on the plurality of data sets, and taking into account the estimated relative directions estimated in step c).

It is noted that the steps a) to e) need not necessarily be performed in that sequence, and one or more steps may be repeated (iterated). In particular, two specific algorithms will be described further, herein referred to as "algorithm1" and "algorithm2".

In the first specific algorithm, the steps c), d) and e) may be repeated one or multiple times, whereby a second (and each further) execution of step c) may take into account a preliminary version of IDTF and HRTF as estimated in step d) and step e) respectively as the transfer function that relates acoustic cues to spatial information. This will be described in more detail with reference to FIG. 12 and FIG. 14.

In the second specific algorithm, the steps c) and d) may be repeated one or multiple times, whereby a second (and each further) execution of step c) may take into account a preliminary version of IDTF as estimated in step d) as the transfer function that relates acoustic cues to spatial information. After the one or more iterations of step c) and step d), the HRTF is estimated in step e). This will be described in more detail with reference to FIG. 13 and FIG. 15.

But the invention is not limited to these specific algorithms, and other specific embodiments relying on the same principles, may also be possible.

Figure 11:
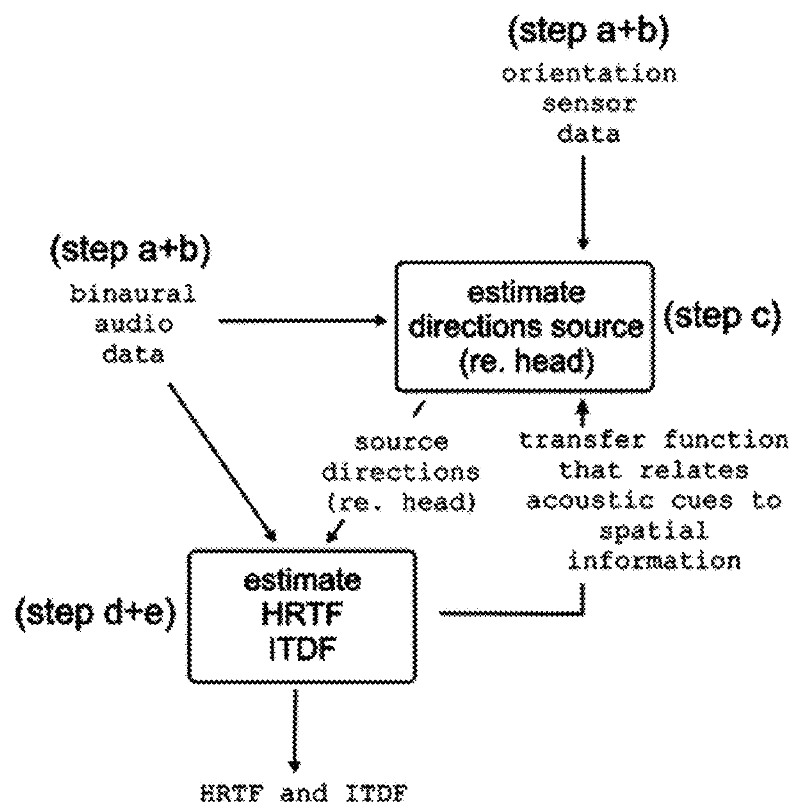
FIG. 11 is a data flow-chart representation of the (generic) algorithm proposed by the present invention.

FIG. 11 is a data flow-chart representation of the (generic) algorithm proposed by the present invention. Based on the orientation sensor data and the binaural audio data, obtained in steps a and b, the directions of the sound source relative to the head at the time of each click are estimated in step c. Based on an assumption of a transfer function, it is possible to extract spatial information on the sound source from the binaural audio data. This transfer function can be the ITDF (relating arrival time differences to the sound source direction), the HRTF (relating binaural spectra to the sound source direction) or any other function that can be derived from these functions, as e.g. the Interaural level difference (ILD), Interaural Intensity difference (IID) or the Interaural Spectral Difference (ISD), known per se in the art. Initially, a general, non-individualized transfer function can be used in step c. Combining the resulting source direction estimates with the binaural audio data, the HRTF and the ITDF can be estimated in steps d and e. Next, based on these new estimates of the HRTF and ITDF, it is possible to 'update' the transfer function used to improve the estimates of the sound source directions, which, in turn, can then be used to re-estimate the HRTF and ITDF. The iteration may be performed a predefined number of times, or until convergence has occurred, resulting in the final estimates of the ITDF and the HRTF.

Figure 12:
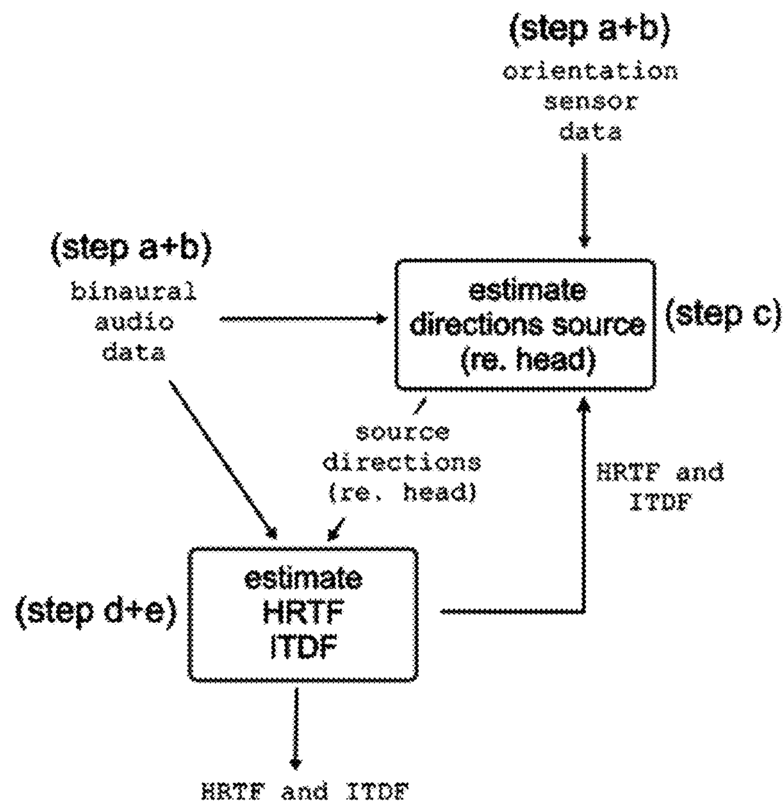
FIG. 12 is a data flow-chart representation of a first specific implementation of the algorithm of FIG. 10, herein referred to as "algorithm1".

FIG. 12 is a data flow-chart representation of a first specific implementation of the algorithm of FIG. 10, herein referred to as "algorithm1". FIG. 12 shows the same data flow as was shown in FIG. 11, in case step c makes use of the HRTF and ITDF as the transfer function to extract spatial information about the sound source from the binaural audio data. Hence, in this algorithm, both the HRTF and ITDF are iteratively adapted in steps d and e using the iteratively improved sound source direction estimates produced in step c.

Figure 13:
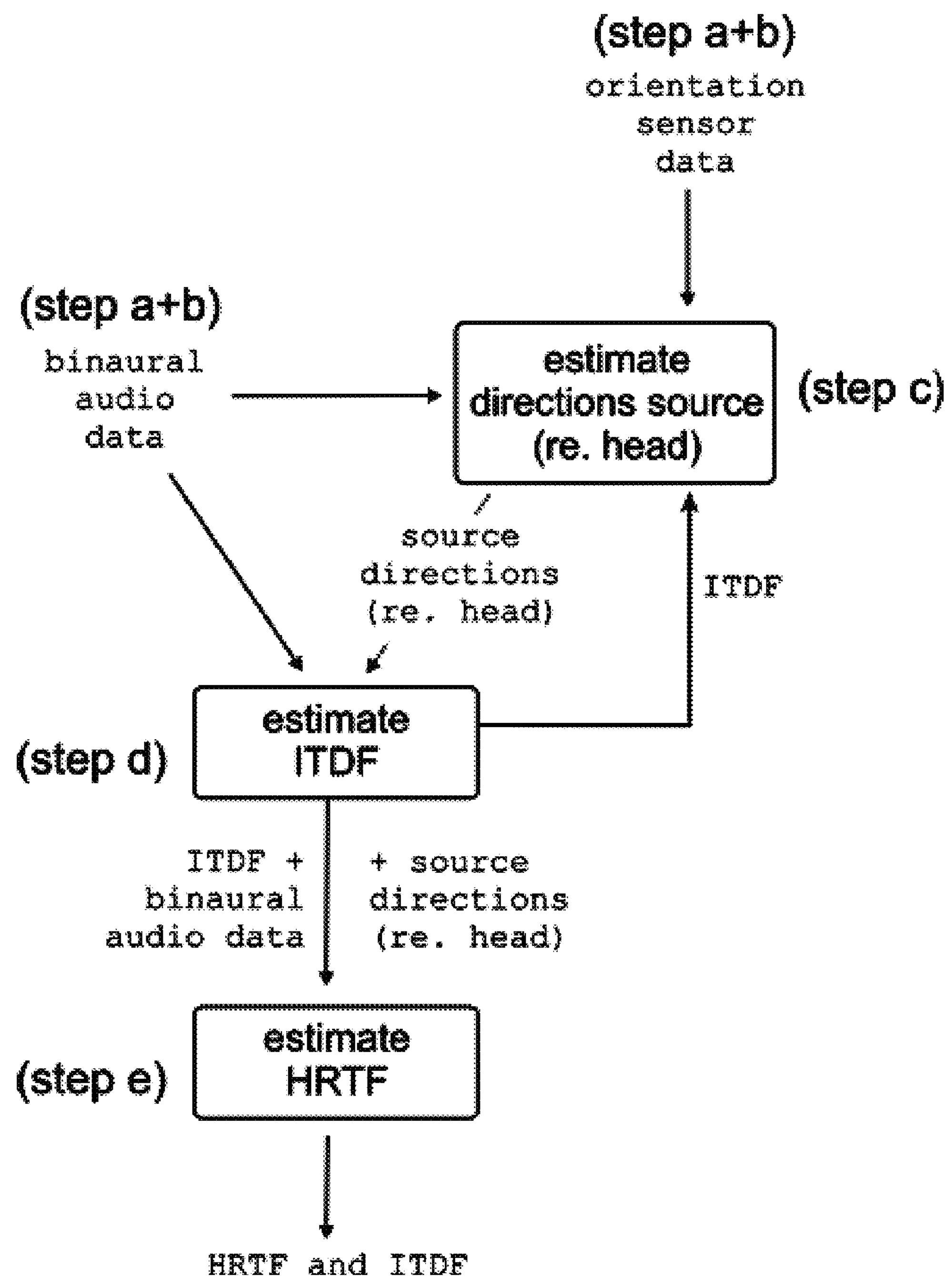
FIG. 13 is a data flow-chart representation of a second specific implementation of the algorithm of FIG. 10, herein referred to as "algorithm2".

FIG. 13 is a data flow-chart representation of a second specific implementation of the algorithm of FIG. 10, herein referred to as "algorithm2". FIG. 13 shows the same data flow as was shown in FIG. 11, in case step c makes use of only the ITDF as the transfer function to extract spatial information about the sound source from the binaural audio data. Hence, only the ITDF is iteratively adapted in step d using the iteratively improved source direction estimates produced in step c. After a predefined number of iterations, or after convergence has occurred, this produces the final estimate of the ITDF, and the resulting source direction estimates combined with the binaural audio data allow to estimate the HRTF. Hence, in this algorithm, step e should only be carried out once.

Figure 14:
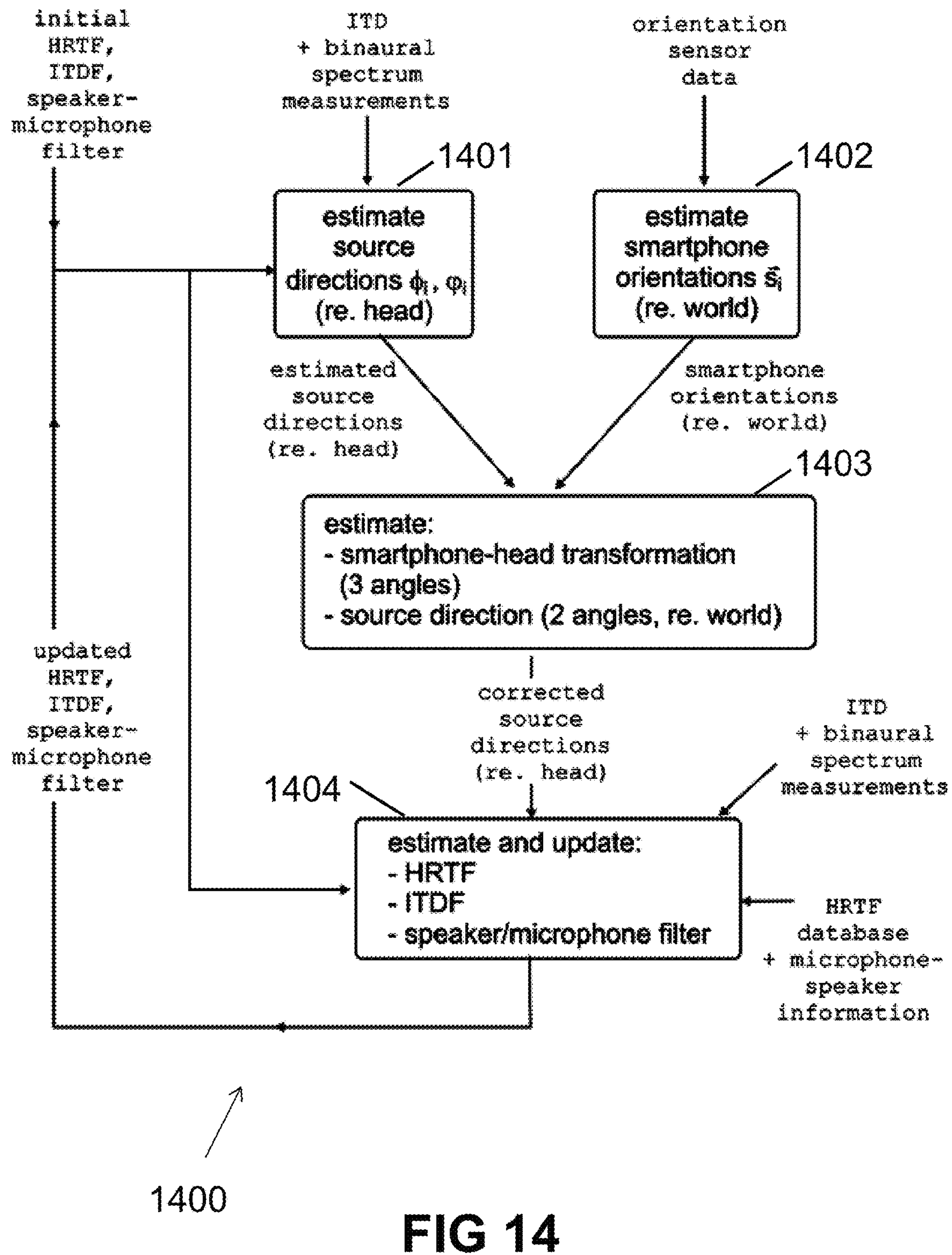
FIG. 14 shows a detailed flow-chart of the first specific implementation ("algorithm1").

FIG. 14 shows a detailed flow-chart of the first specific implementation ("algorithm1").

In a first step 1401, making use of a priori information about the personalized HRTF and ITDF based on statistical analyses of databases containing a plurality of HRTFs and ITDFs and loudspeaker/microphone filter characteristics, the obtained binaural audio data (binaural spectrum and ITD) are used to estimate the source direction ($\phi_\iota$ and $\varphi_i$) at the time of each click i in a coordinate system fixed to the head, see FIG. 2.

In a second step 1402, the obtained smartphone orientation sensor data are used to estimate the smartphone orientation at the time of each click in a coordinate system fixed to the world.

In a third step 1403, the results from the calculations in steps 1401 and 1402 are combined to estimate the transformation (3 angles) from the smartphone coordinate system to the head coordinate system and to estimate the direction of the sound source (2 angles) in the world coordinate system, see FIG. 2. The best estimate for these 5 angles is the one that makes the source directions relative to the head (estimated in step 1401), when combined with the transformed smartphone orientations (estimated in step 1402), map the best onto one single source direction in the world coordinate system.

In a fourth step 1404, the improved source directions relative to the head (estimated in step 1403) are combined with the ITD and the binaural spectrum measurements and the a priori information about the personalized HRTF and ITDF (based on statistical analyses of a databases containing a plurality of HRTFs and ITDFs) to estimate the HRTF and ITDF. The estimated HRTF and ITDF are combined with the previous estimates to calculate an improved estimate of the personalized HRTF and ITDF. The source direction independent components of the improved estimate of the HRTF are used to improve the estimate of the combined spectral filter characteristics of the loudspeaker and the microphone.

The improved estimates of the ITDF, HRTF and the combined spectral filter characteristics of the loudspeaker and the microphone are used in the next iteration starting at step 1401. This iterative procedure can be stopped after a predetermined number of iterations, or when convergence has occurred using some criterion, resulting in the final HRTF and ITDF.

Figure 15:
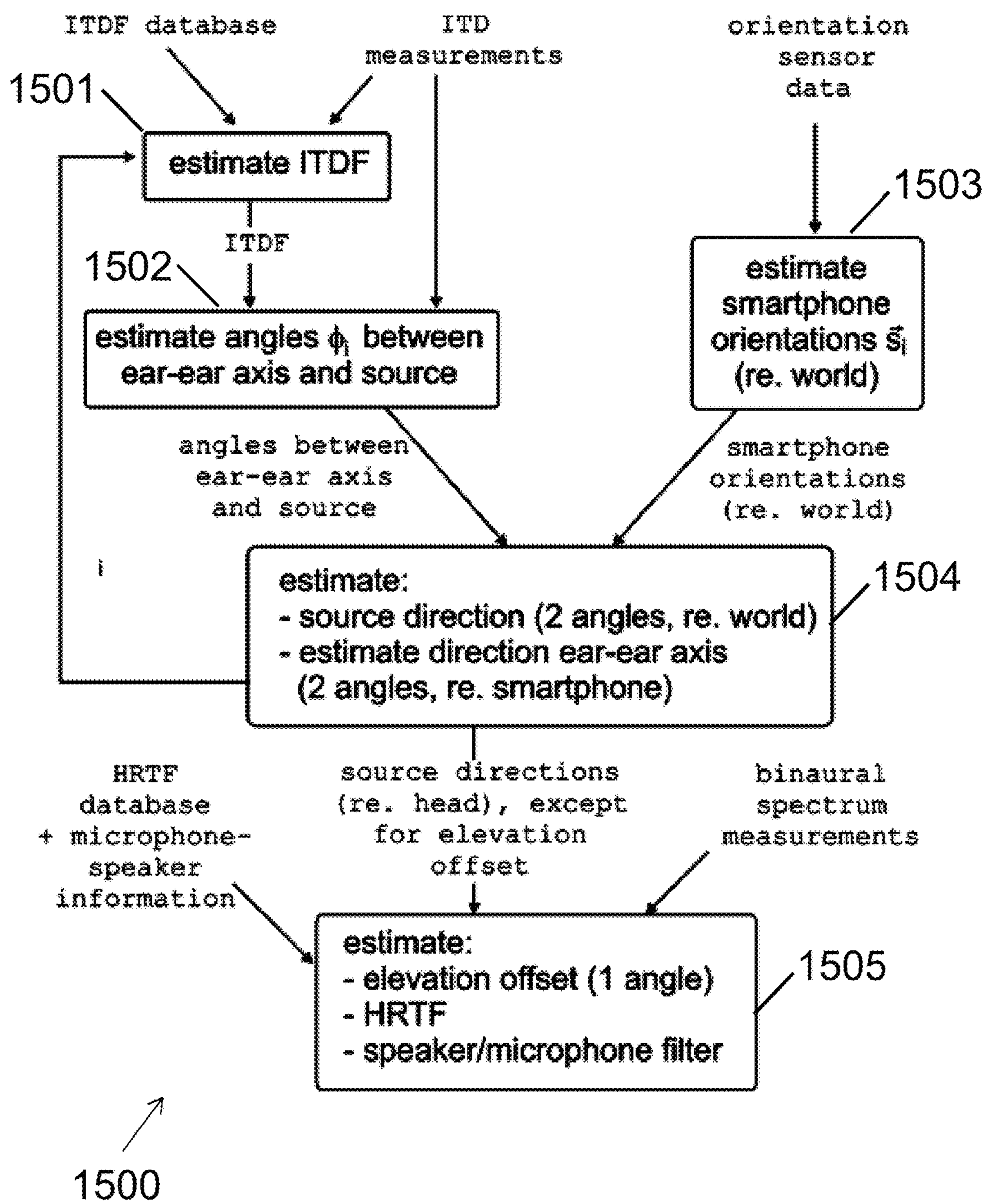
FIG. 15 shows a detailed flow-chart of the second specific implementation ("algorithm2").

FIG. 15 shows a detailed flow-chart of the second specific implementation ("algorithm2").

Using the orientation/position sensors in nowadays smartphones, it is particularly difficult to estimate the rotation angle around the gravitation axis. But this information, encoded by the ITD, can be extracted fairly easily from the acoustic data. Therefore, an alternative version of the algorithm of FIG. 10 uses only the ITD-data to estimate the orientation of the smartphone relative to the sound source. Based on this information, the measured binaural spectrum data is then used to estimate the HRTF and the combined spectral filter characteristics of the loudspeaker and the microphone in a non-iterative way. The alternative algorithm consists of the following steps:

In a first step 1501, the measured ITD-data is combined with a priori information about the personalized ITDF based on statistical analyses of a database containing a plurality of ITDFs to estimate a preliminary ITDF.

In a second step 1502, the measured ITD-data is combined with the preliminary ITDF to estimate the lateral angle $\phi_i$ for every click, i.e., the angle between the ear-ear axis and the source (loudspeaker) direction. Indeed, the ITDF is approx. symmetric around the ear-ear-axis, see FIG. 1 and FIG. 2, hence, the measured ITD-values contain mostly information on the lateral angle $\phi_i$.

In a third step 1503, the orientation sensor data are used to estimate the smartphone orientation for every click in a coordinate system fixed to the world.

In a fourth step 1504, the results of step 1502 and 1503 are then combined to estimate the orientation of the sound source (2 angles) relative to the world coordinate system and the orientation of the ear-ear axis relative to the smartphone (2 angles). For any combination of the 4 parameters, one can now calculate, given the series of measured ITDs and the smartphones orientation data, the presumed movement of the smartphone. In order to optimize the estimate of the 4 parameters, first, one should require internal consistency. Also, if a combination does results in a set of realistic orientations of the smartphone, there is the additional requirement that the head trajectory should be biologically plausible: given the limited time span between the stimuli (e.g. approx. 400 ms), the head movement should be continuous: the head cannot jump between orientations. This continuity measure can be used as the optimizing criterion to arrive at the optimal estimate of the 4 parameters. Given the head orientations during the measurement, one can further improve the estimated movement of the head by smoothing its trajectory, hence removing local noise. The source directions relative to the head can then be extracted except for an elevation offset. Indeed, the exact frontal direction from the perspective of the subject is not yet known. The resulting estimates of the source directions can then be fed back into step 1501, to improve the estimate of the personalized ITDF in an iterative manner. Hence, steps 1501, 1502 and 1504 may be repeated one or multiple times where subsequent executions of step 1501 may take into account the corrected source directions, estimated in previous executions of step 1504.

In a fifth step 1505, the estimated source directions relative to the head, obtained in this iterative process, are combined with a priori information about the personalized HRTF based on statistical analyses of a database containing a plurality of HRTFs, to estimate the elevation offset, the personalized HRTF and the combined spectral filter characteristics of the loudspeaker and the microphone. The source direction independent components of the improved HRTF may be used to improve the estimate of the combined spectral filter characteristics of the loudspeaker and the microphone.

Figure 16:
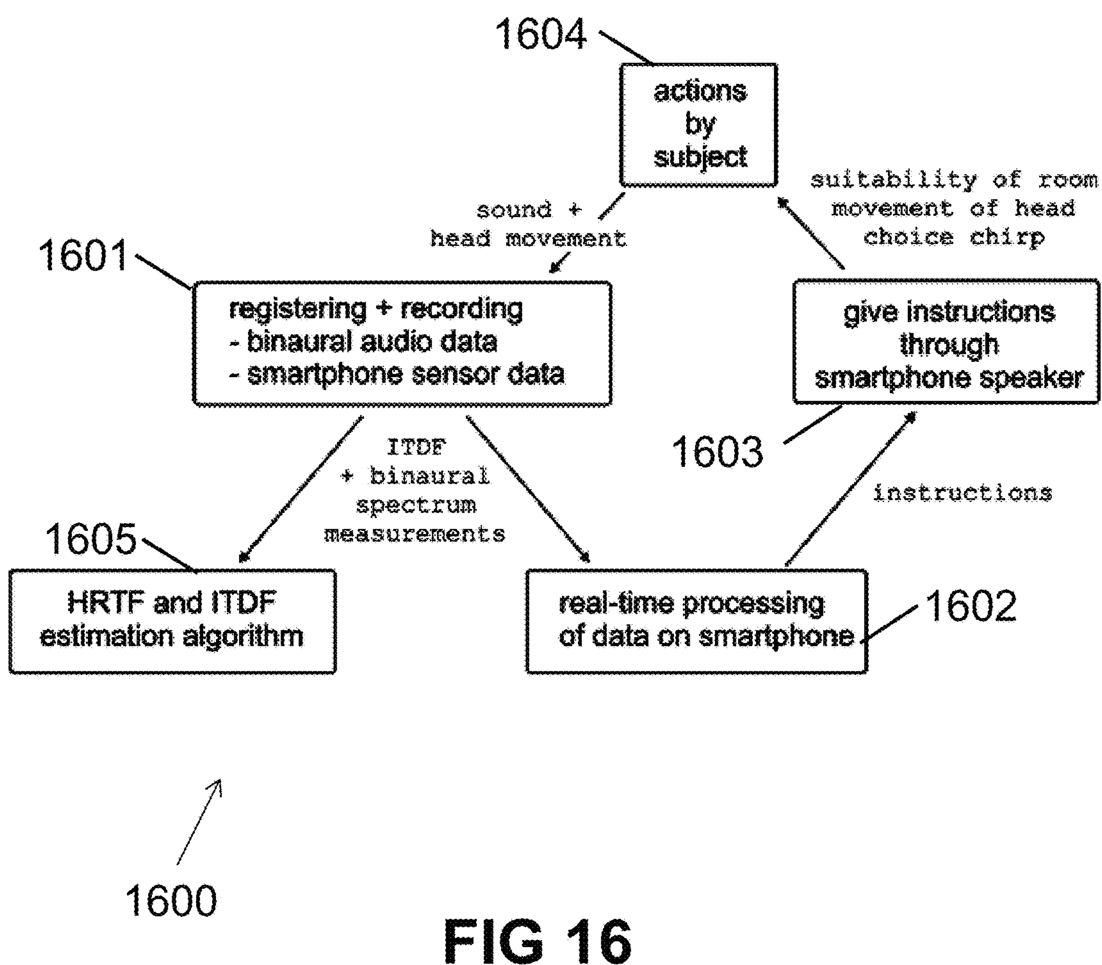
FIG. 16 shows a flow-chart of optional additional functionality as may be used in embodiments of the present invention.

FIG. 16 shows a flow-chart of optional additional functionality as may be used in embodiments of the present invention.

In the simplest setup, a sound file containing the acoustic test signal (a series of acoustic stimuli, e.g. clicks) is rendered on a loudspeaker, and the data is collected by the smartphone. It may be beneficial to include instructions for the subject, to guide him or her through the experiment hence improving the data collection. These instructions may be fixed, e.g. predetermined, as part of the pre-recorded sound file to be rendered through the loudspeaker, or, another possibility may be to process the data collection to some extent in real-time on the computing device, e.g. smartphone and to give immediate feedback to the user, for example in order to improve the data acquisition. This could be achieved by the process outlined in FIG. 16, which comprises the following steps.

In a first step 1601, the smartphone captures, stores and retrieves the orientation sensor data and the binaural audio data.

In a second step 1602, the measured data is processed in real-time on the smartphone. Timing information and/or spectral information from the left and right audio samples may be extracted for the plurality of data sets. Based on this information, the quality of the signal and the experimental setup (for example Signal to Noise ratio of the signals received, overlap with echoes, etc.) can be evaluated. Orientation information (accurate or approximate) may also be extracted for the subset of captured samples, whereby the algorithm further verifies whether the space around the head is sampled with sufficient density. Based on this information, problems can be identified and instructions to improve the data collection can be selected by the algorithm from a group of predefined audio messages, e.g. make sure the ceiling is high enough, make sure there are no reflecting objects within a radius of 1.5 m, increase/decrease the loudspeaker volume, use a different loudspeaker, move the head more slowly, turn a quarter to the left and move the head from left to right, etc.

In a third step 1603, these instructions are communicated in real-time through the speakers of the smartphone.

In a fourth step 1604, the person reacts to these instructions, whose actions are reflected in the subsequent recordings of the binaural audio data and the smartphone sensor data, as obtained in the first step 1601.

In a fifth step 1605, the collected data is used to estimate the HRTF and the ITDF according to the methods described earlier.

OTHER CONSIDERATIONS:

A commercial package sold to the user may comprise: a pair of in-ear microphones, and an audio-CD with the acoustic test signal. Optionally the package may also contain a head strap e.g. an elastic head strap, for fixing the portable device or portable device assembly to the persons head, but the latter is not essential. In fact, also the audio-CD is not essential, as the sound-file could also be downloaded from a particular website, or could be provided by other storage means, such as e.g. a DVD-ROM or a memory-card, or the like. The other hardware needed, in particular a device comprising an orientation sensor unit (such as e.g. a suitable smartphone), and a sound reproducing system with a loudspeaker (e.g. a stereo chain, or a computer with a sound-card, or an MP3-player or the like) and an audio capture unit (e.g. said smartphone equipped with a add-on device, or a computer, or the like) is expected to be owned already by the end-user, but could also be offered as part of the package.

The method, computer program and algorithm of the present invention do not aim at providing the most accurate HRTF and ITDF, but rather to approximate it sufficiently close so that at least the main problems of front vs. back misperceptions, and/or up vs. down misperceptions are drastically reduced, and preferably completely eliminated.

The present invention makes use of nowadays widespread technologies (smartphones, microphones, and speakers), combined with a user-friendly procedure that allows the user to execute the procedure him- or herself. Even though smartphones are widespread, using a smartphone to record stereo audio signals in combination with orientation information is not widespread, let alone to use the audio signals to correct the orientation information, relate the unknown orientation of the orientation unit to the reference frame of the head as used in standard HRTF and ITDF measurements, and localize the sound source. This means that the method proposed herein is more flexible (more user-friendly), and that the complexity of the problem is shifted from the data capturing step/set-up towards the post-processing, i.e. the estimation algorithm.

| REFERENCE LIST: | | |
|---|---|---|
| 501, 601, 801: computer | 502, 602, 702, 802: loudspeaker | |
| 503, 603, 703, 803: person | 504, 604, 704, 804: orientation unit | |
| 505, 605, 705, 805: in-ear microphones | 506: support | 507: chair |
| 608, 708, 808: sound reproduction equipment | | |

The invention claimed is:

1. A method of estimating an individualized head-related transfer function and an individualized interaural time difference function of a particular person in a computing device, the method comprising the steps of:

a) obtaining a plurality of data sets (Li, Ri, Oi), each data set comprising a left audio sample (Li) originating from a left in-ear microphone and a right audio sample (Ri) originating from a right in-ear microphone and orientation information (Oi) originating from an orientation unit, the left audio sample and the right audio sample and the orientation information of each data set being simultaneously captured in an arrangement wherein:

the left in-ear microphone being inserted in a left ear of the person, and the right in-ear microphone being inserted in a right ear of the person, and the orientation unit being mounted on or to a head of the person, and the person being located at a distance from a first loudspeaker, and the first loudspeaker being arranged for rendering an acoustic test signal comprising a plurality of audio test-fragments (Ci), and the person turning a head in a plurality of different orientations during the rendering of the acoustic test signal;

b) storing the plurality of data sets (Li, Ri, Oi) in a memory;

c) estimating a direction of the first loudspeaker with respect to the head of the person based on the plurality of captured data sets (Li, Ri, Oi) stored in the memory, for each data set (Li, Ri, Oi) stored in the memory;

d) estimating the individualized ITDF of the person, based on the plurality of data sets (Li, Ri, Oi) stored in the memory and based on the directions estimated in step c);

e) estimating the individualized HRTF of the person, based on the plurality of data sets (Li, Ri, Oi) stored in the memory and based on the directions estimated in step c).

2. The method according to claim 1, wherein the estimation of step c) is based on the plurality of captured data sets (Li, Ri, Oi) stored in the memory and on at least one transfer function that relates acoustic cues to spatial information.

3. The method according to claim 2, wherein the at least one transfer function that relates acoustic cues to spatial information is an interaural time difference function (ITDF) or a combination thereof with a head-related transfer function (HRTF).

4. The method according to claim 1, wherein step d) of estimating the ITDF function comprises making use of a priori information about the personalized ITDF based on statistical analysis of a database containing a plurality of ITDFs of different persons and/or wherein step e) of estimating the HRTF comprises making use of a priori information about the personalized HRTF based on statistical analysis of a database containing a plurality of HRTFs of different persons.

5. The method according to claim 1, wherein step c) comprises:

extracting timing information from the left and right audio samples of the plurality of data sets;

extracting spectral information from the left and right audio samples of the plurality of data sets;

estimating the directions of the first loudspeaker with respect to the head of the person, based on the extracted timing information and spectral information, thereby using a general ITDF or using a general ITDF combined with a general HRTF.

6. The method according to claim 5, wherein step d) comprises: determining an estimate of the individualized ITDF, based on the timing information and spectral information contained in the left and right audio samples, and on the estimated directions of step c); and wherein step e) comprises: determining an estimate of the individualized HRTF, based on the timing information and spectral information contained in the left and right audio samples, and on the estimated directions of step c).

7. The method according to claim 6, further comprising one or more iterations of the following combination of steps:

i) after performing step d) and step e), performing again step c) for obtaining an updated estimation of the directions of the first loudspeaker with respect to the head of the person, but using the estimate of the individualized ITDF as determined in step d) instead of using the general ITDF or using a combination of the estimate of the individualized HRTF and the individualized ITDF as determined in step e) instead of using the combination of the general HRTF and the general ITDF;

ii) after performing step i), performing again step d) for obtaining an update of the individualized ITDF of the person, using the updated estimation of the directions of the first loudspeaker of step i);

iii) after performing step i), performing again step e) for obtaining an update of the individualized HRTF of the person, using the updated estimation of the directions of the first loudspeaker of step i).

8. The method according to claim 5, wherein step e) is performed after execution of the combination of step c) and step d); and wherein step d) comprises determining an estimate of the individualized ITDF, and wherein step e) further comprises:

extracting spectral information from the left and right audio samples (Li, Ri) of the plurality of data sets;

estimating an elevation offset based on the extracted spectral information;

determining an estimate of the individualized HRTF, based on the timing information and spectral information contained in the left and right audio samples, and on the estimated directions of the first loudspeaker of step c).

9. The method according to claim 8, further comprising at least one iteration of the followings combination of steps:

i) performing again step c) for obtaining an updated estimation of the directions of the first loudspeaker, whereby in the second and each subsequent execution of step c) the estimate of the individualized ITDF is used instead of the general ITDF;

ii) performing again step d) for obtaining an updated individualized ITDF of the person, using the updated estimation of the directions of the first loudspeaker of step i).

10. The method according to claim 1, further comprising the step of:

rendering the acoustic test signal via the first loudspeaker.

11. The method according to claim 1, further comprising the step of:

selecting, dependent on an analysis of the captured data sets, a predefined audio-message from a group of predefined audio messages, and rendering said selected audio-message via a second loudspeaker, different from the first loudspeaker, for providing information or instructions to the person before and/or during and/or after the rendering of the acoustic test signal.

12. A method of rendering a virtual audio signal for a particular person, comprising:

x) estimating an individualized head-related transfer function (HRTF) and an individualized interaural time difference function (ITDF) of said particular person using a method according to claim 1;

y) generating a virtual audio signal for the particular person, by making use of the individualized head-related transfer function (HRTF) and the individualized interaural time difference function (ITDF) estimated in step x);

z) rendering the virtual audio signal generated in step y) using a stereo headphone and/or a set of in-ear loudspeakers.

13. A 3D-VAS system comprising a computing device and a stereo headphone and/or a set of in-ear loudspeakers, the computing device being adapted for performing a method for estimating an individualized head related transfer function (HRTF) and an interaural time difference function (ITDF) of a particular person using a method according to claim 1.

14. A computer program product stored on a non-transitory computer-readable medium for estimating an individualized head related transfer function (HRTF) and an interaural time difference function (ITDF) of a particular person, the computer program product being adapted for performing, when run on a computing device, a method according to claim 1.

15. A non-transitory computer-readable medium comprising the computer program product according to claim 14.

* * * * *